United States Patent
Mochizuki

(10) Patent No.: US 10,499,315 B2
(45) Date of Patent: Dec. 3, 2019

(54) INFORMATION PROCESSING APPARATUS AND INFORMATION PROCESSING METHOD

(71) Applicant: SONY CORPORATION, Tokyo (JP)

(72) Inventor: Daisuke Mochizuki, Chiba (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/742,970

(22) PCT Filed: May 20, 2016

(86) PCT No.: PCT/JP2016/065085
§ 371 (c)(1),
(2) Date: Jan. 9, 2018

(87) PCT Pub. No.: WO2017/013937
PCT Pub. Date: Jan. 26, 2017

(65) Prior Publication Data
US 2018/0227829 A1 Aug. 9, 2018

(30) Foreign Application Priority Data
Jul. 22, 2015 (JP) .................. 2015-144610

(51) Int. Cl.
*H04W 48/04* (2009.01)
*H04M 1/02* (2006.01)
(Continued)

(52) U.S. Cl.
CPC ......... *H04W 48/04* (2013.01); *H04M 1/0202* (2013.01); *H04M 1/605* (2013.01); *H04M 1/6058* (2013.01); *H04M 1/7253* (2013.01); *H04M 1/72569* (2013.01); *G06F 1/163* (2013.01)

(58) Field of Classification Search
None
See application file for complete search history.

(56) References Cited

U.S. PATENT DOCUMENTS 9,883,376 B2 * 1/2018 Shin ................ H04W 8/24
2003/0003947 A1 1/2003 Yasuda
(Continued)

FOREIGN PATENT DOCUMENTS

| CN | 1395402 A | 2/2003 |
| JP | 2003-018286 A | 1/2003 |

(Continued)

OTHER PUBLICATIONS

International Search Report and Written Opinion of PCT Application No. PCT/JP2016/065085, dated Jun. 14, 2016, 09 pages of ISRWO.

*Primary Examiner* — Candal Elpenord
(74) *Attorney, Agent, or Firm* — Chip Law Group

(57) ABSTRACT

To enable communication between a plurality of users to continue in a more preferred mode, provided is an information processing apparatus for controlling a mode of second communication via a network between a plurality of users who are targets of interactive communication, depending on a determination result of whether first direct communication is allowed between the plurality of users.

18 Claims, 13 Drawing Sheets

(51) Int. Cl.
*H04M 1/60* (2006.01)
*H04M 1/725* (2006.01)
*G06F 1/16* (2006.01)

(56) References Cited

U.S. PATENT DOCUMENTS

| | | | | |
|---|---|---|---|---|
| 2013/0315059 A1* | 11/2013 | Magatani | ............ | H04W 68/005 370/230 |
| 2015/0281344 A1* | 10/2015 | Grootwassink | ....... | H04L 67/104 713/168 |
| 2017/0280491 A1* | 9/2017 | Salkintzis | ............. | H04W 8/265 |

FOREIGN PATENT DOCUMENTS

| | | | |
|---|---|---|---|
| JP | 2009-153072 | A | 7/2009 |
| JP | 2011-233960 | A | 11/2011 |
| JP | 2014-045416 | A | 3/2014 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/065085 filed on May 20, 2016, which claims priority benefit of Japanese Patent Application No. JP2015-144610 filed in the Japan Patent Office on Jul. 22, 2015. Each of the above-referenced applications is hereby incorporated herein by reference in its entirety.

TECHNICAL FIELD

The present disclosure relates to an information processing apparatus, an information processing method, and a program.

BACKGROUND ART

The development of communication technology makes it possible for users in remote areas to communicate with each other via a network. In particular, nowadays it has become possible to transmit and receive not only voice but also image data such as moving images via a network in real time, so interactive communication in a state closer to the case where they face each other is allowed between users at remote locations.

Further, nowadays, with the development of communication technology and the reduction in size of various devices, types of devices that are so-called information processing apparatuses have become diversified. In addition, devices, such as smartphones and tablet terminals, which are configured to be carried by a user, as well as a personal computer (PC) or the like, becomes widespread. In addition, nowadays, a so-called wearable terminal also has been developed, which is configured to be usable while being carried by the user wearing it on a part of the body. In one example, Patent Literature 1 discloses an example of a communication terminal configured to be carried and capable of communicating interactively with other users via a network.

CITATION LIST

Patent Literature

Patent Literature 1: JP 2009-153072A

DISCLOSURE OF INVENTION

Technical Problem

In this way, with the development of technology relating to communication between users including the advancement of communication technology and the reduction in size of various devices, it is possible for users to communicate interactively with a desired communication partner anytime and anywhere. Thus, nowadays, in one example, a situation where users who are communicating with each other via a network actually face each other in a real world can be contemplated.

On the other hand, in a case where users are facing each other, the users can directly communicate with their partners. In this case, if communication via a network is established together with the direct communication, the users sometimes feel such communication via the network as troublesome. Thus, the case where the user who actually faces the communication partner temporarily stops the communication via the network with the communication partner can be contemplated.

Further, in a case where users are apart from each other, the direct communication between the users may be difficult. Thus, in such a case, it can be contemplated that the users can restart the communication via a network and continue communicating with their partners.

Under such circumstances, there is a case where a user determines a current situation by his/her own judgment and performs a conscious operation to stop or restart the communication via a network with a partner if necessary. Such an operation makes users feel troublesome in some cases.

In view of this, in the present disclosure, there is provided an information processing apparatus, information processing method, and program, capable of continuing communication between a plurality of users in a more preferred mode.

Solution to Problem

According to the present disclosure, there is provided an information processing apparatus including: a control unit configured to control, depending on a result obtained by determining whether first direct communication is allowed between a plurality of users to be an interactive communication targets, a mode of second communication via the network between the plurality of users.

In addition, according to the present disclosure, there is provided an information processing method including: controlling, by a processor, depending on a result obtained by determining whether first direct communication is allowed between a plurality of users to be an interactive communication targets, a mode of second communication via the network between the plurality of users.

In addition, according to the present disclosure, there is provided a program causing a computer to execute: controlling, by a processor, depending on a result obtained by determining whether first direct communication is allowed between a plurality of users to be an interactive communication targets, a mode of second communication via the network between the plurality of users.

Advantageous Effects of Invention

According to the present disclosure as described above, there is provided an information processing apparatus, information processing method, and program, capable of continuing communication between a plurality of users in a more preferred mode.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
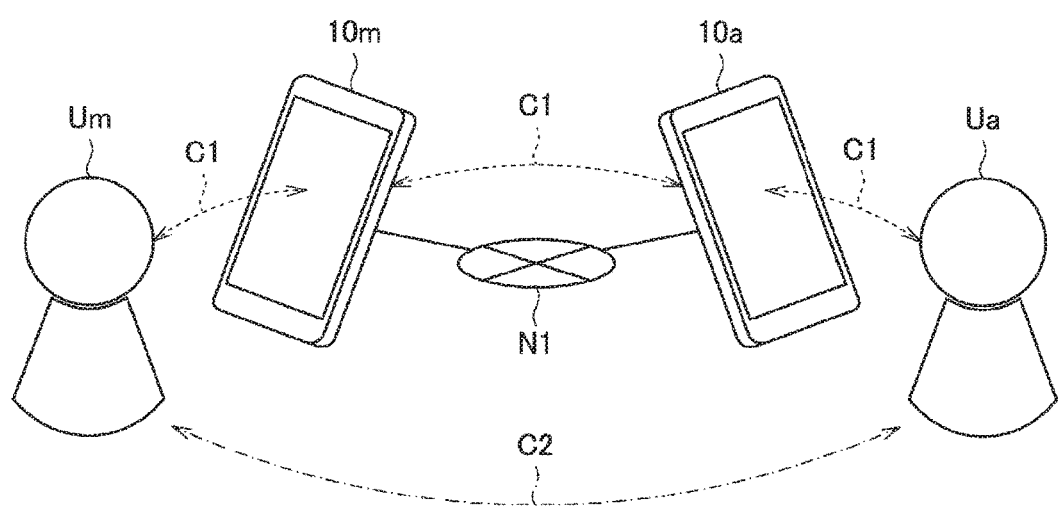
FIG. 1 is a diagram illustrated to describe an overview of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Moreover, the description will be given in the following order.
1. Overview
2. Functional Configuration
3. Processing
4. Modifications
4.1. First Modification: Example of control of communication among three or more users
4.2. Second Modification: Example of state notification and control of communication
5. Illustrative Examples
5.1. First Illustrative Example: Example of form of information processing apparatus
5.2. Second Illustrative Example: Example of device to be linked
5.3. Third Illustrative Example: Example of additional control
6. Hardware Configuration
7. Concluding Remarks
<1. Overview>

An overview of an information processing system according to the present embodiment is now described with reference to FIG. 1. FIG. 1 is a diagram illustrated to describe an overview of the information processing system according to the present embodiment.

As illustrated in FIG. 1, the information processing system according to the present embodiment is configured so that an information processing apparatus 10 of each of a plurality of users is capable of interactively transmitting and receiving information on the basis of communication via a network N1. The network N1 is not limited to a particular mode as long as the network N1 is an electronic network that connects different devices with each other, such as the Internet, leased lines, local area networks (LANs), or wide area network (WANs). In addition, the network N1 is configured as a wireless network. In addition, in a more specific example, the network N1 may be a network used in direct communication between terminals, such as Wi-Fi (registered trademark: Wireless Fidelity) and Bluetooth (registered trademark). Moreover, the network N1 may include a plurality of networks, or some of them may be configured as a wired network.

In one example, in FIG. 1, reference numeral 10m denotes the information processing apparatus 10 corresponding to a user Um. In addition, reference numeral 10a denotes the information processing apparatus 10 corresponding to a user Ua.

In the example illustrated in FIG. 1, the connection between the users Um and Ua using their respective information processing apparatuses 10 via the network N1 makes it possible to establish interactive communication (e.g., communication through voice and video) even in a situation where they are located at places apart from each other (e.g., remote locations). Moreover, in FIG. 1, reference numeral C1 schematically denotes a channel for communication between the users Um and Ua using their respective information processing apparatuses 10 connected via the network N1 (i.e., communication via the network N1).

Moreover, the information processing apparatus 10 may be configured to be portable, such as a so-called smartphone or tablet terminal. In such a case, in one example, it is also possible for each user to carry the information processing apparatus 10 and to move while communicating with other users using the information processing apparatus 10. Under such situation, in one example, it can be contemplated that a moving user, which actually meets (comes face to face with) another user who is communicating using the information processing apparatus 10 in the real world, can directly communicate with the other user (i.e., communication to be established without using a device such as the information processing apparatus 10).

In a specific example, in the case of the example illustrated in FIG. 1, there can be situations where the user Um is moving to a place for meeting with the user Ua while the user Um communicates with the user Ua via the network N1 by using the information processing apparatus 10m. In such a case, the user Um faces the user Ua when reaching a meeting place with the user Ua, so the user Um may be able to communicate directly with the user Ua without using the information processing apparatus 10m held by the user Um. Moreover, in FIG. 1, reference numeral C2 schematically denotes a channel for direct communication between the users Um and Ua.

Specifically, when the users Um and Ua who are communicating via the channel C1 face each other, the communication via the channel C1 (i.e., the communication via the network N1) and the direct communication via the channel C2 coexist. Under such circumstances, in one example, the user Um may be hindered in communication by hearing two voices, that is, the voice of the user Ua that is output from the information processing apparatus 10m on the basis of the communication via the channel C1 and the voice of the user Ua that directly propagates via the channel C2.

Thus, it can be contemplated that the user Um, when facing the user Ua, operates the information processing apparatus 10m to temporarily stop the communication via the channel C1 so that the user Um directly communicates with the user Ua in a more preferred environment.

On the other hand, in a case where one of the users Um and Ua is moving and the users Um and Ua are apart from each other, it may be difficult to perform the direct communication between the users Um and Ua in some cases. Thus, in one example, there may be a case where the user Um does not face the user Ua as the user Um moves (i.e., being apart from each other). In this case, in order for the user Um to continue communicating with the user Ua, it can be contemplated that the user Um operates the information processing apparatus 10m to restart the communication via the channel C1.

Specifically, there may be a case where the state in which the users Um and Ua face each other and the state in which they are apart from each other are switched appropriately. In this case, the user Um may determine whether direct communication with the user Ua is allowed (i.e., whether the user Um is in the face-to-face state with the user Ua or not) by his/her own judgment and may perform a conscious operation to stop or restart the communication via the channel C1.

On the other hand, in some cases, the user Um feels that it is troublesome to perform the conscious determination as to whether the user Um faces the user Ua and the conscious operation to stop or restart the communication via the channel C1 as necessary.

The information processing system according to the present embodiment is made in view of such circumstances. Specifically, in the information processing system according to the present embodiment, the information processing apparatus 10 determines whether the direct communication (communication via the channel C2) is allowed between users who are targets of interactive communication and controls the communication via the network N1 (communication via the channel C1) depending on a result obtained by the determination.

Figure 2:
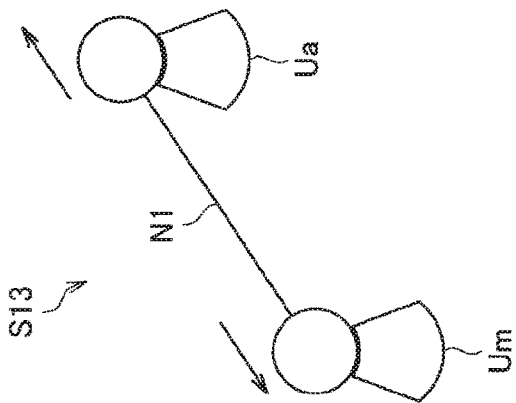
FIG. 2 is a diagram illustrated to describe an example of a schematic operation of the information processing system according to the present embodiment.
Figure 2:
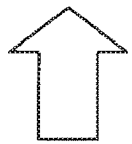
Figure 2:
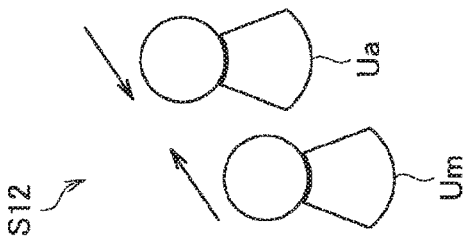
Figure 2:
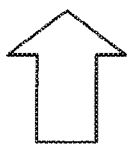
Figure 2:
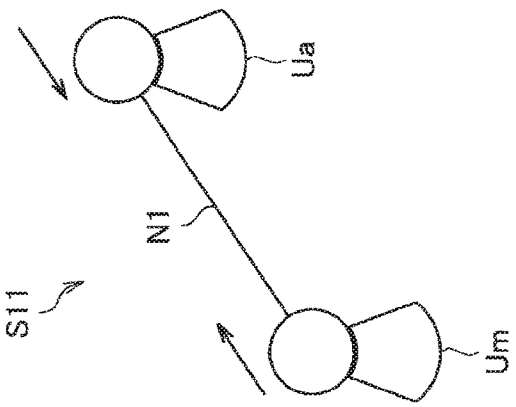

An example of a schematic operation of the information processing system according to the present embodiment is described below with reference to FIG. 2. FIG. 2 is a diagram illustrated to describe an example of a schematic operation of the information processing system according to the present embodiment.

In FIG. 2, the state denoted by reference numeral S11 indicates a state in which the users Um and Ua are apart from each other and the users Um and Ua are communicating via the network N1. In addition, reference numeral S12 indicates a state in which, after the state S11, the users Um and Ua face each other and direct communication is allowed. In addition, reference numeral S13 indicates a state in which, after the state S12, the users Um and Ua are apart from each other again and direct communication is difficult.

In one example, the information processing apparatus 10m held by the user Um activates the communication via the network N1 in the state S11 in which the user Um is apart from the user Ua. This makes it possible for the user Um to communicate with the user Ua via the network N1 by using the information processing apparatus 10m.

Subsequently, the information processing apparatus 10m detects that the users Um and Ua are facing each other (i.e., direct communication is allowed) as shown in the state S12. Moreover, the information processing apparatus 10m may recognize whether the users Um and Ua face each other on the basis of position information of the information processing apparatus 10m and position information of the information processing apparatus 10a held by the user Ua. The position information is acquired, in one example, by global positioning system (GPS) or position detection techniques using wireless LAN such as Wi-Fi (registered trademark: Wireless Fidelity). In a more specific example, the information processing apparatus 10m, in a case of recognizing that the distance to the information processing apparatus 10a held by the user Ua is equal to or less than a threshold value (e.g., in a case of recognizing the distance is within voice reachable range), may recognize that the users Um and Ua face each other. As long as the information processing apparatus 10m is capable of recognizing whether the users Um and Ua face each other, it is apparent that a recognition method is not limited to a particular method.

The information processing apparatus 10m, when detecting that the users Um and Ua face each other, suppress the communication via the network N1. In this event, in one example, the information processing apparatus 10m may stop or disconnect the communication via the network N1. In addition, in another example, the information processing apparatus 10m may suppress output of at least some pieces of information acquired via the network N1 (e.g., voice, image, haptic information (e.g., vibration), or the like) from the information processing apparatus 10a. More specifically, the information processing apparatus 10m may lower the output level of information from the information processing apparatus 10a, or eventually stop outputting the information. In addition, the information processing apparatus 10m may reduce the amount of information to be output on the basis of the information from the information processing apparatus 10a.

Moreover, when it is detected that the users Um and Ua are facing each other, in one example, as long as the information processing apparatus 10m suppresses output of at least some pieces of the information from the information processing apparatus 10a, there is no limit as to which apparatus suppresses the information, and a method of suppressing the information is not specifically limited.

In one example, the information processing apparatus 10m may suppress output of at least some pieces of the information transmitted from the information processing apparatus 10a, on the basis of various types of control in the information processing apparatus 10a operating as an information transmitter.

In a specific example, the information processing apparatus 10a may lower the level of information (e.g., lower the sensitivity or the like) acquired by an input device (e.g., image capture device, sound collection device, various sensors, or the like) for acquiring various types of information such as video and voice, or may stop the operation of the input device, thereby suppressing acquisition of information performed by the input device. Consequently, this makes it possible for the information processing apparatus 10m to suppress output of the information under the situation where the information acquired by the input device is transmitted from the information processing apparatus 10a to the information processing apparatus 10m.

Further, in another example, the information processing apparatus 10a may suppress output of the information from the information processing apparatus 10m by controlling the information to be transmitted to the information processing apparatus 10m. In a specific example, the information processing apparatus 10a may lower the output level of information to be transmitted to the information processing apparatus 10m, and then may transmit the information to the information processing apparatus 10m. In addition, the information processing apparatus 10a may stop the transmission of information itself directed toward the information processing apparatus 10m. The control as described above makes it possible to suppress output of the information in the information processing apparatus 10m's side.

Further, in a case where another apparatus (e.g., a server or the like) is interposed between the information processing apparatuses 10m and 10a, it is possible to suppress output of the information from the information processing apparatus 10m by allowing the another apparatus to control the information to be transmitted from the information processing apparatus 10a to the information processing apparatus 10m.

Such control makes it possible for the information processing apparatus 10m to suppress the occurrence of a situation in which the communication via the network N1 and the direct communication coexist. This allows the user Um to communicate with the user Ua in a more preferred mode.

Subsequently, as shown in the state S13, it is assumed that the information processing apparatus 10m detects that the users Um and Ua are apart from each other again (i.e., detects that direct communication has become difficult). Moreover, the information processing apparatus 10m, in one example, in a case of recognizing that the distance to the information processing apparatus 10a held by the user Ua exceeds a threshold value, may recognize that the users Um and Ua are apart from each other.

Upon detecting that the users Um and Ua are apart from each other, the information processing apparatus 10m restart the communication via the network N1 that has been previously suppressed. In a specific example, in a case where the communication via the network N1 is stopped, the information processing apparatus 10m restarts the communication. In addition, in this event, in the case where the communication via the network N1 is disconnected, the information processing apparatus 10m may re-establish the communication. In addition, in another example, in a case where output of the information acquired via the network N1 from the information processing apparatus 10a is suppressed, the information processing apparatus 10m may restart the output of the information.

In this way, in the case where it is detected that the direct communication between the users Um and Ua is difficult, the information processing apparatus 10m causes the communication via the network N1 between the users Um and Ua to be restarted. This makes it possible for the user Um to continue communicating with the user Ua even in a case where the user Um is apart from the user Ua.

As described above, the information processing apparatus 10 in the information processing system according to the present embodiment determines whether a plurality of users to communicate with each other are in the face-to-face state (i.e., whether direct communication is allowed), and controls the communication via the network depending on a result obtained by the determination.

The control as described above makes it possible for the user to continue communicating with the partner in a more preferred mode without being conscious of whether the users faces the partner, even in a situation where their states are changed frequently between the face-to-face state and the non-face-to-face state.

Moreover, in the example described above, the case where the users Um and Ua interactively communicate with each other via the network N1 is described as an example, but the communication via the network N1 is not necessarily limited to the interactive communication. In a specific example, only one of the users Um and Ua may transmit information, while the other user may only perform reception of information. Note that, the following description is given on the assumption that the communication via the network N1 is interactive communication between the users Um and Ua to make the characteristics of the information processing system according to the present embodiment easier to understand.

In the above, with reference to FIG. 2, the example of the schematic operation of the information processing system according to the present embodiment is described below. Moreover, the information processing system according to the present embodiment is described below in more detail.

<2. Functional Configuration>

Figure 3:
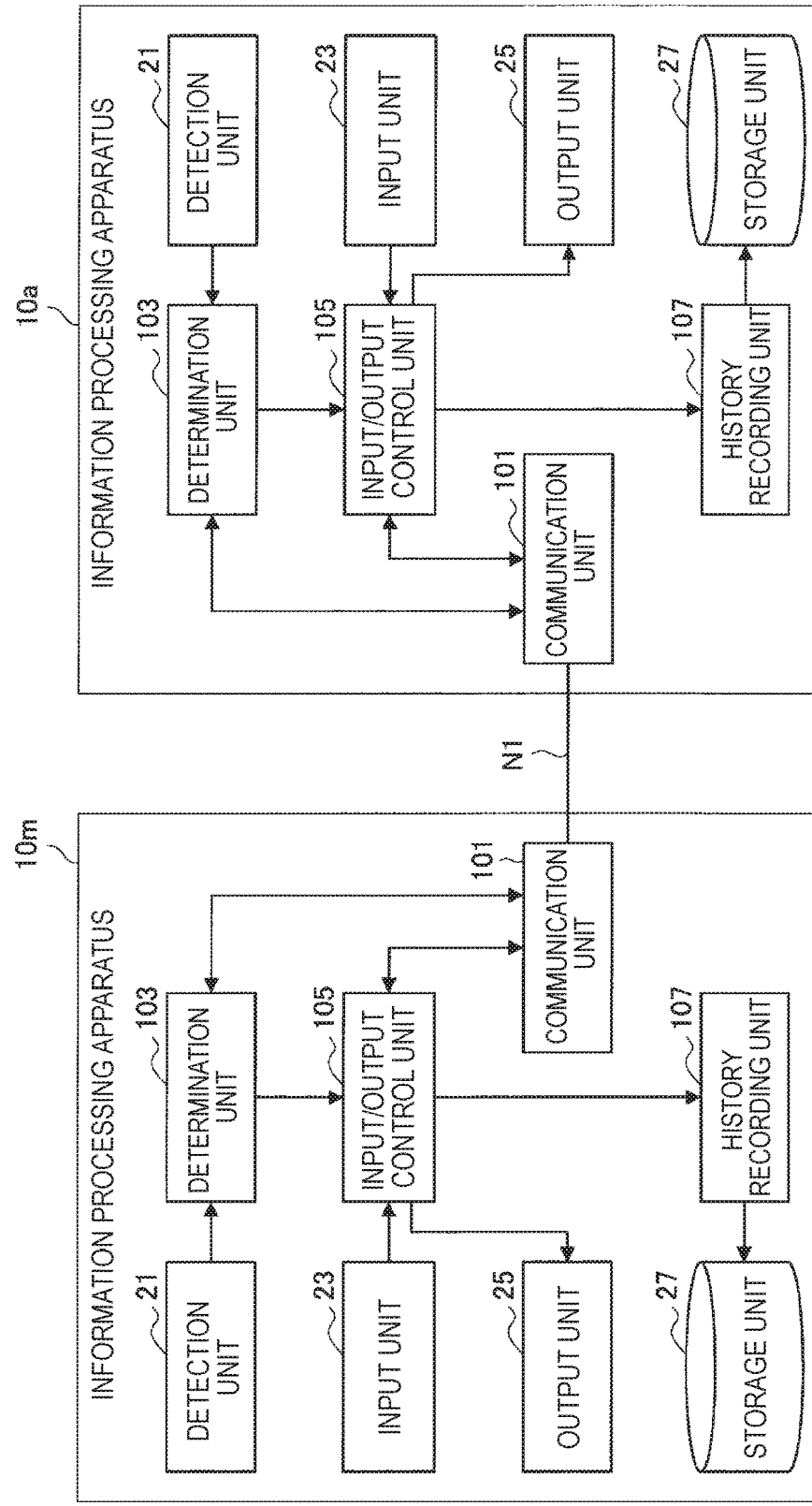
FIG. 3 is a block diagram illustrating an example of a functional configuration of the information processing system according to the present embodiment.

With reference to FIG. 3, an example of the functional configuration of the information processing system according to the present embodiment is now described, by particularly focusing on the functional configuration of the information processing apparatus 10. FIG. 3 is a block diagram illustrating an example of the functional configuration of the information processing system according to the present embodiment. Moreover, as illustrated in FIG. 3, the information processing apparatus 10m and the information processing apparatus 10a have the similar configuration. Thus, in the case where the information processing apparatus 10m and the information processing apparatus 10a are not explicitly distinguished, they will be simply referred to herein as the information processing apparatuses 10.

As illustrated in FIG. 3, the information processing apparatus 10 may include a communication unit 101, a determination unit 103, an input/output control unit 105, a detection unit 21, an input unit 23, and an output unit 25. Further, the information processing apparatus 10 may include a history recording unit 107 and a storage unit 27.

The input unit 23 is an input interface used by a user to input various types of information to the information processing apparatus 10. In one example, the input unit 23 may include a sound collection device that collects voice uttered by the user as sound information, such as a so-called microphone. In addition, the input unit 23 may include an image capture unit that captures an image (e.g., a still image or a moving image) of a photographic subject (e.g., a user) contained in a predetermined image capture range. In addition, the input unit 23 may include an input device for a user to input information, such as a button, a switch, a touch panel, or the like. It is apparent that the example described above is merely an example, and the type of the input unit 23 or the type of information input by the input unit 23 is not specifically limited, as long as the user is able to input various types of information to the information processing apparatus 10.

The input unit 23 outputs the input information, which is input by the user, to the input/output control unit 105 to be described later. A specific example is focused on a case where a user communicates with another user using a moving image and voice. In this case, the input unit 23 inputs a sound collection result (i.e., input of voice) by the sound collection device of the voice uttered by the user and an image of the photographic subject (i.e., input of image) captured by the image capture unit to the input/output control unit 105.

The output unit 25 is an output interface used by the information processing apparatus 10 to present various types of information to the user. The output unit 25 may include an acoustic device that outputs acoustic information, such as a loudspeaker. In addition, the output unit 25 may include a device for outputting image information including a still image or a moving image, such as a so-called display. It is apparent that the example described above is merely an example. As long as the information processing apparatus 10 is capable of presenting various types of information to the user, the type of the output unit 25 or the type of information output by the output unit 25 are not specifically limited.

The output unit 25 outputs information instructed from the input/output control unit 105 under the control of the input/output control unit 105. In a specific example, the focus is on a case where a user communicates with another user using a moving image and voice. In this case, the output unit 25 acquires the voice of a communication partner from the input/output control unit 105 and outputs the acquired voice through the acoustic device. In addition, the output unit 25 acquires an image of the communication partner from the input/output control unit 105 and causes the acquired image to be displayed on a display.

The storage unit 27 is a storage area used by the information processing apparatus 10 to hold various types of information temporarily or permanently. In addition, in the storage unit 27, data (e.g., a library) used by the information processing apparatus 10 to execute various functions (e.g., application software) may be stored in advance.

The detection unit 21 acquires information used, by the determination unit 103 to be described later, to determine whether users to communicate with each other are in the face-to-face state (i.e., whether the direct communication is allowed). In one example, the detection unit 21 may include a device, such as GPS, which acquires position information of the information processing apparatus 10.

Further, in another example, the detection unit 21 may include a configuration for acquiring various types of information of the external environment of the user (in other words, the external environment of the information processing apparatus 10). In a specific example, the detection unit 21 may include an image capture unit that captures an image of the external environment (i.e., an image of surroundings of the user). In addition, the detection unit 21 may include a sound collection device for collecting environmental sound from the external environment.

Moreover, the example described above is merely an example, and as long as the determination unit 103 can determine whether the users to communicate with each other are in the face-to-face state, the type of the detection unit 21 or the type of information acquired by the detection unit 21 is not specifically limited. In addition, an example of a method of determining whether users to interactively communicate with each other are in the face-to-face state on the basis of a result obtained by the detection performed by the detection unit 21 will be described later in conjunction with details of the determination unit 103.

The detection unit 21, when acquiring information relating to a detection target, outputs the information acquired as the detection result to the determination unit 103.

Moreover, the timing at which the detection unit 21 acquires the information relating to the detection target is not specifically limited. In one example, the detection unit 21 may sequentially monitor a change in the detection target and may output information indicating the monitoring result to the determination unit 103.

Further, in another example, in a case where predetermined processing is executed, the detection unit 21 may acquire the information relating to the detection target using the processing as a trigger. In a more specific example, in the case where the information processing apparatus 10 communicates with another external apparatus via a network or in the case where another sensor detects information, the detection unit 21 may acquire the information relating to the detection target using the processing as a trigger.

The communication unit 101 is configured so that each component in the information processing apparatus 10 establishes communication with an external apparatus (e.g., another information processing apparatus 10) via a network to transmit and receive various types of information (various types of data) to and from the external apparatus. Moreover, the following description is given on the assumption that, in the case where each component in the information processing apparatus 10 transmits and receives information to and from the external apparatus via the network, the information is transmitted and received through the communication unit 101 even in a case where it is not explicitly stated.

The determination unit 103 acquires information indicating the detection result of the detection target from the detection unit 21 and determines whether a plurality of users to interactively communicate with each other are in the face-to-face state (i.e., whether the direct communication is allowed) on the basis of the acquired information. Next, an example of the detailed operation of the determination unit 103 will be described by focusing on, in particular, the operation of the determination unit 103 included in the information processing apparatus 10$m$ held by the user Um.

In one example, as described above, the determination unit 103 may determine whether a plurality of users who are targets of interactive communication are in the face-to-face state on the basis of the distance between the plurality of users (in other words, the distance between the information processing apparatuses 10 held by the respective users).

In this case, the determination unit 103 acquires, in one example, information indicating the result obtained by detecting the position of the information processing apparatus 10$m$ (hereinafter may be referred to as "position information" in some cases) from the detection unit 21. In addition, the determination unit 103 may acquire the position information of the information processing apparatus 10$a$, which transmits and receives information to and from the information processing apparatus 10$m$ on the basis of the communication via the network N1, from the information processing apparatus 10$a$ in accordance with the communication. The determination unit 103 may calculate the distance between the information processing apparatuses 10$m$ and 10$a$ (in other words, the distance between the users Um and Ua) on the basis of the acquired position information of the information processing apparatuses 10$m$ and 10$a$. It is apparent that the example described above is merely an example, and a method of calculating the distance between the information processing apparatuses 10$m$ and 10$a$ is not specifically limited, as long as it is possible to calculate the distance between the information processing apparatuses. In a specific example, in the case where the information processing apparatuses 10$m$ and 10$a$ are communicating directly, the determination unit 103 may calculate the distance between the information processing apparatuses 10$m$ and 10$a$ on the basis of the arrival time of radio waves (in other words, the delay time) or the like. In addition, in this event, in a case where the radio wave used for the distance calculation is not detected (i.e., the radio wave does not reach), the determination unit 103 may determine that the distance between the information processing apparatuses 10$m$ and 10$a$ exceeds a threshold value.

Moreover, the determination unit 103 may transmit the information indicating the acquired result obtained by detecting the position of the information processing apparatus 10m to the information processing apparatus 10a via the network N1. This makes it possible for the determination unit 103 of the information processing apparatus 10a to recognize the position information of the information processing apparatus 10m.

Further, the determination unit 103, in a case of determining that the distance between the users Um and Ua is equal to or less than the threshold value and recognizing that at least one of the users Um and Ua is facing the direction of the other user, may recognize that the users Um and Ua are in the face-to-face state.

More specifically, the determination unit 103 may estimate the direction in which each user is facing on the basis of the change (in other words, the moving direction) in the position information of the information processing apparatus 10 held by each user. The determination unit 103 may determine whether at least one user is facing the direction of the other user on the basis of the estimation result. In addition, in another example, the determination unit 103 may estimate the direction in which the user holding the information processing apparatus 10 is facing on the basis of the result obtained by detecting the orientation of the information processing apparatus 10 held by each user. It is apparent that a method of estimating the direction in which the user is facing (or the direction in which the information processing apparatus 10 held by the user is facing) is not specifically limited, as long as it is possible to estimate the direction in which the user is facing. In a specific example, the determination unit 103 may calculate the orientation on the basis of the result obtained by detecting geomagnetic field and may estimate the direction in which the user is facing on the basis of the calculation result of the orientation.

Further, in another example, in the case where the determination unit 103 recognizes that, in the field of view of at least one of the users Um and Ua, the other user is present, the determination unit 103 may recognize that the users Um and Ua are in the face-to-face state.

In this case, in one example, the determination unit 103 analyzes images in front of the eyes of the users Um and Ua, which are captured by the image capture unit (e.g., the image capture unit included in the detection unit 21) or the like. Then, in a case where the determination unit 103 recognizes that, in the image corresponding to at least one of the users, the other user is included on the basis of the analysis result, the determination unit 103 may recognize that the users Um and Ua are in the face-to-face state.

More specifically, in one example, the determination unit 103 acquires, from the detection unit 21, the image in front of the eyes of the user Um, which is captured by the image capture unit included in the detection unit 21. Further, the determination unit 103 acquires, from the information processing apparatus 10a via the network N1, the image in front of the eyes of the user Ua, which is captured by the image capture unit included in the detection unit 21 of the information processing apparatus 10a. Then, the determination unit 103 may analyze each acquired image on the basis of a technique for identifying an individual, such as face recognition technology or the like, and the determination unit 103 may determine whether the target user is captured in the image on the basis of the analysis result.

Further, the determination unit 103 may determine whether the users Um and Ua are in the face-to-face state on the basis of the result obtained by collecting environmental sound around the respective users Um and Ua.

In this case, in one example, the determination unit 103 analyzes the sound collection result of environmental sound around the respective users Um and Ua, which is collected by the sound collection device (e.g., the sound collection device included in the detection unit 21) or the like. Then, in a case where the sound collection result corresponding to at least one user contains the voice of the other user, the determination unit 103 may recognize that the users Um and Ua are in the face-to-face state on the basis of the analysis result.

More specifically, in one example, the determination unit 103 acquires, from the detection unit 21, the sound collection result of environmental sound around the user Um, which is collected by the sound collection device included in the detection unit 21. In addition, the determination unit 103 acquires, from the information processing apparatus 10a via the network N1, the sound collection result of environmental sound around the user Um, which is collected by the sound collection device included in the detection unit 21 of the information processing apparatus 10a. Then, in one example, the determination unit 103 may extract voice by detecting a voice section from each of the acquired sound collection results. The determination unit 103 may determine whether the voice of the target user is contained in the sound collection result by analyzing the extracted voice on the basis of a technique for identifying an individual, such as voice authentication technology or the like.

It is apparent that a method of determining whether the users Um and Ua are in the face-to-face state is not specifically limited, as long as it is possible to determine whether the users Um and Ua are in the face-to-face state on the basis of the sound collection result of environmental sound around the respective users Um and Ua. In a specific example, the determination of whether the users Um and Ua are in the face-to-face state may be performed on the basis of whether one information processing apparatus 10 outputs acoustic with a predetermined pattern (e.g., acoustic in an inaudible area) and the other information processing apparatus 10 can collect the acoustic.

Moreover, the processing associated with the determination of the face-to-face state between a plurality of users as described above is merely an example. A method of determining whether a plurality of target users are in the face-to-face state (in other words, whether the direct communication between the plurality of users is allowed) is not specifically limited, as long as it is possible to determine whether a plurality of target users are in the face-to-face state.

As described above, the determination unit 103 determines whether a plurality of users (e.g., the users Um and Ua) who are targets of interactive communication are in the face-to-face state, and outputs information indicating the determination result to the input/output control unit 105.

The input/output control unit 105 has a configuration for controlling the operation relating to communication via the network N1 between a plurality of users (e.g., between the users Um and Ua). The following description is given with regard to an example of the detailed operation of the input/output control unit 105 by focusing on the operation of the input/output control unit 105 included in the information processing apparatus 10m held by the user Um.

In one example, when the input/output control unit 105 receives an instruction to start the communication via the network N1 with the user Ua from the user Um through the input unit 23, the input/output control unit 105 starts the communication via the network N1 with the information processing apparatus 10a of the user Ua. Moreover, in this event, in a case where the communication via the network N1 with the information processing apparatus 10a is not established, the input/output control unit 105 may establish the communication by executing a predetermined communication sequence with the information processing apparatus 10a.

Further, in a case where the user Um instructs to terminate the communication with the user Ua via the network N1 through the input unit 23, the input/output control unit 105 may terminate the communication via the network N1 with the information processing apparatus 10a.

Moreover, a method of instructing the information processing apparatus 10m to start or terminate the communication by the user Um is not specifically limited, as long as it is possible for the user Um to instruct the information processing apparatus 10m to start or terminate the communication. In a specific example, there may be a case where the information processing apparatus 10m recognizes contact or proximity of the information processing apparatus 10a using so-called short-range wireless communication such as near field communication (NFC). In this case, the information processing apparatus 10m may start the communication via the network N1 with the information processing apparatus 10a (eventually, communication between the users Um and Ua) on the basis of the recognition result.

Further, in another example, the information processing apparatus 10 may be configured so that the communication is started (the communication between the information processing apparatuses 10 is started) in the case where users who are targets of interactive communication swing their respective information processing apparatuses 10 held by them and their vibration patterns match. In this case, the information processing apparatus 10m detects a change in its own position or orientation on the basis of an acceleration sensor, an angular velocity sensor (gyro sensor), or the like. In addition, the information processing apparatus 10m acquires, from the information processing apparatus 10a, a result obtained by detecting a change in the position or orientation of the information processing apparatus 10a. Then, in the case where their vibration patterns match between the information processing apparatus 10m and the information processing apparatus 10a, the information processing apparatus 10m may start the communication via the network N1 with the information processing apparatus 10a (eventually, the communication between the users Um and Ua).

Further, the input/output control unit 105 controls input of information from the user Um, output of information to the user Um, and transmission and reception of information with the information processing device 10a during the continuation of the communication via the network N1 between the users Um and Ua.

In one example, the input/output control unit 105 acquires information indicating voice (i.e., input of voice) uttered by the user Um or information indicating an image (i.e., input of image) obtained by capturing the user Um as a photographic subject through the input unit 23 as input information. The input/output control unit 105 transmits the acquired input information to the information processing apparatus 10a on the basis of the communication via the network N1.

Further, the input/output control unit 105 acquires information input by the user Ua, such as voice uttered by the user Ua (i.e., input of voice) or an image obtained by capturing the user Ua as a photographic subject (i.e., input of image), from the information processing apparatus 10b on the basis of the communication via the network N1. The input/output control unit 105 presents the acquired information input by the user Ua to the user Um by causing the output unit 25 (e.g., an acoustic device or a display) to output it.

The control as described above makes it possible to establish the interactive communication via the network N1 between the users Um and Ua.

Further, the input/output control unit 105 may acquire the information indicating the determination result as to whether the users Um and Ua are in the face-to-face state from the determination unit 103, and may control the communication via the network N1 between the users Um and Ua on the basis of the acquired information.

More specifically, in the case where the input/output control unit 105 recognizes that the users Um and Ua are in the face-to-face state on the basis of the information acquired from the determination unit 103, the input/output control unit 105 may control the communication via the network N1 between the users Um and Ua.

In this event, the input/output control unit 105 may suppress the communication via the network N1 between the users Um and Ua, in one example, by temporarily stopping transmission and reception of information to and from the information processing apparatus 10a. In addition, the input/output control unit 105 may suppress the communication via the network N1 between the users Um and Ua by disconnecting the communication with the information processing apparatus 10a.

Further, in another example, the input/output control unit 105 may suppress the communication via the network N1 between the users Um and Ua by temporarily stopping the output of the information input by the user Ua (i.e., presentation of input information by the user Ua to the user Um), which is acquired from the information processing apparatus 10a.

The control as described above makes it possible for the input/output control unit 105 to prevent the occurrence of a situation in which the direct communication and the communication via the network N1 coexist between the users Um and Ua.

Further, there may be a case where the input/output control unit 105 wants to recognize that the users Um and Ua are not in the face-to-face state (hereinafter may be referred to as "non-face-to-face state" in some cases) on the basis of the information acquired from the determination unit 103. In this case, the input/output control unit 105 may activate the communication via the network N1 between the users Um and Ua.

In one example, the input/output control unit 105 may activate the communication via the network N1 between the users Um and Ua by resuming the temporarily stopped transmission and reception of information to and from the information processing apparatus 10a. In addition, in this event, in the case where the communication with the information processing apparatus 10a is disconnected, the input/output control unit 105 may re-establish the communication.

Further, in a case where the input/output control unit 105 temporarily stops output of the information input by the user Ua, which is acquired from the information processing apparatus 10a, the input/output control unit 105 may restart the output of the input information.

As described above, in the case where the direct communication between the users Um and Ua is difficult, the input/output control unit 105 activates the communication via the network N1. This makes it possible for the users Um and Ua to continue interactive communication in the case where the direct communication is difficult. Moreover, in the case of being in the non-face-to-face state, the input/output control unit 105 may switch whether to activate the communication via the network N1 on the basis of the setting instructed previously by the user. Specifically, even in the case where the users Um and Ua are in the non-face-to-face state (i.e., case where the direct communication is difficult), the input/output control unit 105 does not have to activate the communication via the network N1 between the users Um and Ua depending on the setting instructed previously by the user.

Moreover, the input/output control unit 105 may cause the history recording unit 107 to be described later to record the contents of communication between the users Um and Ua as history information. The history recording unit 107 causes the storage unit 27 to store the information output from the input/output control unit 105 as history information, in one example.

Specifically, the input/output control unit 105 may cause the history recording unit 107 to record information (e.g., input of voice or image) which is input from the user Um, and acquired from the input unit 23, as history information. Moreover, in this event, the input/output control unit 105 converts the voice input into text information by performing the analysis based on so-called voice recognition technology or natural language processing techniques on the acquired voice input, and may cause the history recording unit 107 to record the text information as history information.

Further, the input/output control unit 105 may cause the history recording unit 107 to record the information input by the user Ua.

In a specific example, the input/output control unit 105 may cause the history recording unit 107 to record the information input by the user Ua, which is acquired via the network N1, as history information. Moreover, in this case, the input/output control unit 105 may continue transmitting and receiving information from and to the information processing apparatus 10*a* via the network N1 even in the case where the users Um and Ua are in the face-to-face state. Thus, it remains in a state in which the information input by the user Ua is capable of being acquired from the information processing apparatus 10*a*.

Further, in another example, in the case where the users Um and Ua are in the face-to-face state, the input/output control unit 105 may directly acquire the information input by the user Ua. In a specific example, the input/output control unit 105 may extract the voice of the user Ua from the voice collected by the sound collection device included in the input unit 23, and may acquire the extraction result as the information input by the user Ua (i.e., input of voice). In addition, the input/output control unit 105 may extract the image of the user Ua from the result obtained by capturing the image in front of the eyes of the user Um by the image capture unit on the basis of the technique for identifying the individual, such as the face recognition technology. The input/output control unit 105 may acquire the extraction result as information input by the user Ua (i.e., input of image).

Moreover, it is apparent that the contents recorded as the history information are not necessarily limited to voice input or image input. In a specific example, the input/output control unit 105 may cause the history recording unit 107 to record, as history information, the contents of communication between users on the basis of text information such as a so-called messaging service. In addition, it is apparent that the input/output control unit 105 may perform unified management of different types of input information, such as voice, image, and text, which is input by each user, as history information.

Such a configuration makes it possible for the user Um to check the contents of communication with the user Ua on the basis of the history information recorded by the history recording unit 107.

Moreover, the above description is given with regard to the example in which the input/output control unit 105 explicitly switches activation/deactivation of the communication between the users Um and Ua via the network N1 depending on the determination result as to whether the users Um and Ua are in the face-to-face state. However, it is not necessarily limited to the control described above.

In one example, even in the case where the input/output control unit 105 determines that the users Um and Ua are in the face-to-face state, the input/output control unit 105 may suppress the communication via the network N1 after elapse of a predetermined period without immediately suppressing the communication via the network N1.

Further, in another example, the input/output control unit 105 may perform transition between the communication via the network N1 and the direct communication by controlling a sound volume (e.g., sound volume of voice) of the communication via the network N1 between the users Um and Ua depending on the distance between the users Um and Ua.

More specifically, in a case where the distance between the users Um and Ua is equal to or less than a threshold value, the input/output control unit 105 controls the sound volume of the voice transmitted and received via the network N1 so that the sound volume becomes smaller as the distance becomes shorter. Such control makes it possible to perform seamless transition of the communication between the users Um and Ua from the communication via the network N1 to the direct communication.

Further, the input/output control unit 105 may control the sound volume of the voice transmitted and received via the network N1 so that the sound volume becomes larger as the distance between the users Um and Ua becomes longer. Such control makes it possible to perform seamless transition of the communication between the users Um and Ua from the direct communication to the communication via the network N1 in the situation in which the users Um and Ua become apart from each other from the face-to-face state.

Further, the information processing apparatus 10 may set different conditions to the case where it is determined that the transition of the users Um and Ua from the non-face-to-face state to the face-to-face state is performed (i.e., the case of suppressing the communication via the network N1) and to the case where the transition of the users Um and Ua from the face-to-face state to the non-face-to-face state is performed (i.e., the case of resuming the communication via the network N1).

In a specific example, the information processing apparatus 10 may set different threshold values for the determination of the distance between the users Um and Ua to the case where it is determined that the transition from the non-face-to-face state to the face-to-face state is performed and to the case where it is determined that the transition from the face-to-face state to the non-face-to-face state is performed.

Further, the information processing apparatus 10 may perform the determination based on different conditions for the case where it is determined that the transition from the non-face-to-face state to the face-to-face state is performed and the case where it is determined that the transition from the face-to-face state to the non-face-to-face state is performed. In a more specific example, in the case where it is determined that the transition from the non-face-to-face state to the face-to-face state is performed, the information processing apparatus 10 may use a fact that at least one of the users Um and Ua faces the other one, as a condition for the determination, in addition to the condition of the distance between the users Um and Ua. On the other hand, in the case where it is determined that the transition from the face-to-face state to the non-face-to-face state is performed, the information processing apparatus 10 may perform the determination based only on the condition for the distance between the users Um and Ua.

Further, the information processing apparatus 10 may execute the control of the communication via a network based on the result of the above-described determination on whether the state is the face-to-face state in a limited way on the basis of a predetermined condition. In a specific example, the information processing apparatus 10 may execute the control of the communication via the network based on the result of the determination on whether the state is the face-to-face state only when the information processing apparatus 10 is within a predetermined area such as an inside of a predetermined facility.

Further, the functional configuration of the information processing apparatus 10 described above with reference to FIG. 3 is merely an example, and is not limited to the configuration described above as long as each function of the information processing apparatus 10 can be implemented.

In one example, some of the components of the information processing apparatus 10 may be provided outside the information processing apparatus 10. In a more specific example, at least one of the detection unit 21, the input unit 23, the output unit 25, and the storage unit 27 may be attached externally to the outside of the information processing apparatus 10.

Further, in another example, some of the components of the information processing apparatus 10 (e.g., at least one of the determination unit 103, the history recording unit 107, and the storage unit 27) may be provided in an external apparatus (e.g., a server) connected via a network.

In a more specific example, a server that mediates transmission and reception of information between the information processing apparatuses 10*m* and 10*a* may be provided, and the components equivalent to the determination unit 103 and the input/output control unit 105 may be provided in the server.

In this case, in one example, the server acquires information indicating the detection result obtained by the detection unit 21 in each of the information processing apparatuses 10*m* and 10*a*, and determines whether the users Um and Ua are in the face-to-face state on the basis of the acquired information.

Then, the server may control the communication via the network N1 between the users Um and Ua by controlling the transmission and reception of information between the information processing apparatuses 10*m* and 10*a* on the basis of the determination result between the users Um and Ua. Specifically, in a case where the server recognizes that the users Um and Ua are in the face-to-face state, the server may control the communication via the network N1 between the users Um and Ua by temporarily stopping the transmission and reception of information between the information processing apparatuses 10*m* and 10*a*.

An example of the functional configuration of the information processing system according to the present embodiment is described above with reference to FIG. 3.

<3. Processing>

Figure 4:
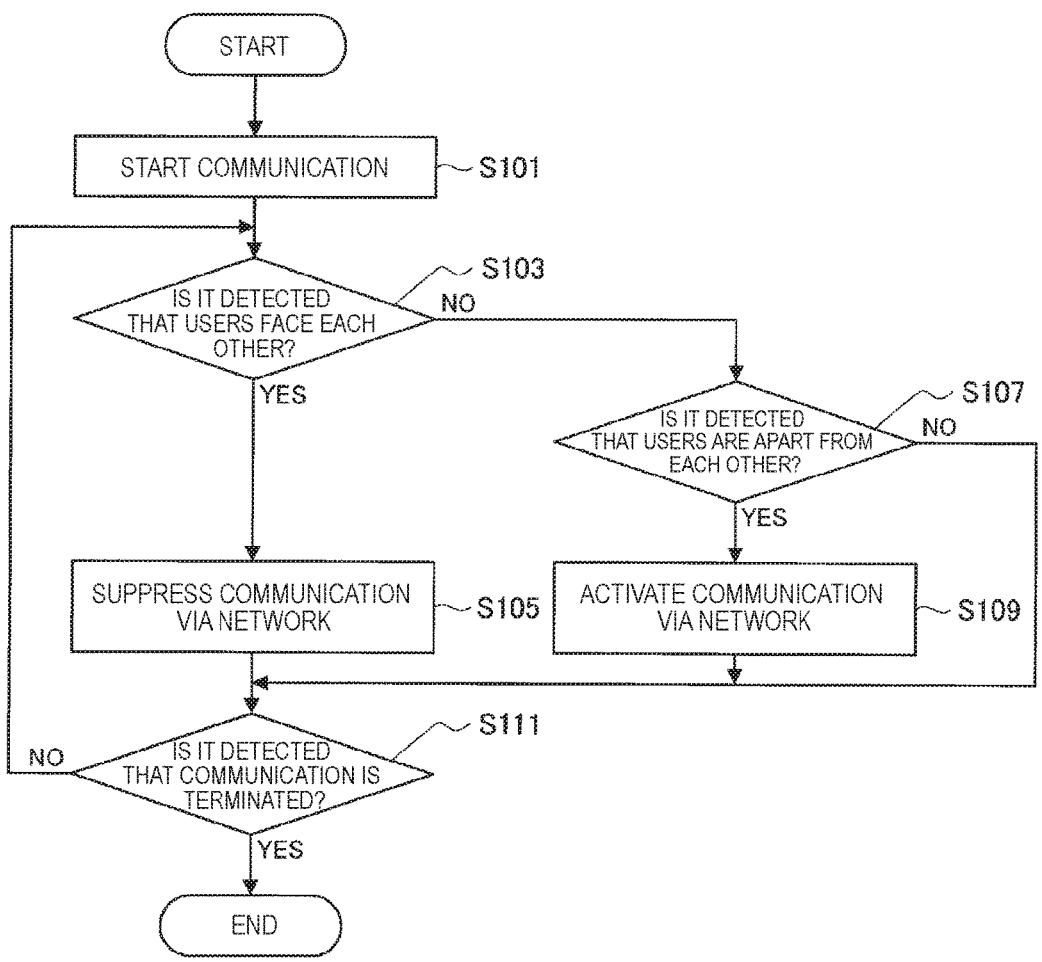
FIG. 4 is a flowchart illustrating an example of a series of processing procedures in the information processing system according to the present embodiment.

Subsequently, an example of a series of processing procedures of the information processing system according to the present embodiment will be described with reference to FIG. 4. FIG. 4 is a flowchart illustrating an example of a series of processing procedures in the information processing system according to the present embodiment. Moreover, this description is given by focusing on the operation of the information processing apparatus 10*m* held by the user Um in the case where the user Um communicates with the user Ua as illustrated in FIG. 1.

(Step S101)

The input/output control unit 105, when receiving an instruction by the user Um through the input unit 23 to start the communication via the network N1 with the user Ua, starts the communication via the network N1 with the information processing apparatus 10*a* of the user Ua. Moreover, in this event, in a case where the communication via the network N1 with the information processing apparatus 10*a* is not established, the input/output control unit 105 may establish the communication by executing a predetermined communication sequence with the information processing apparatus 10*a*.

(Step S103)

The detection unit 21 acquires information to be used by the determination unit 103 to determine whether users (i.e., users Ua and Ub) who are targets of interactive communication are in the face-to-face state, and outputs the acquired information to the determination unit 103. The determination unit 103 determines whether the users Um and Ua are in the face-to-face state on the basis of the information acquired from the detection unit 21, and outputs the information indicating the determination result to the input/output control unit 105. The input/output control unit 105 acquires information indicating the determination result on whether the users Um and Ua are in the face-to-face state, from the determination unit 103.

(Step S105)

In the case where the input/output control unit 105 recognizes that the users Um and Ua are in the face-to-face state on the basis of the information acquired from the determination unit 103 (YES in step S103), the input/output control unit 105 may suppress the communication via the network N1 between the users Um and Ua.

(Step S109)

On the other hand, the input/output control unit 105, in the case of recognizing that the users Um and Ua are in the non-face-to-face state on the basis of the information acquired from the determination unit 103 (NO in step S103 and YES in step S107), activates the communication via the network N1 between the users Um and Ua.

(Step S107)

Moreover, in the case where there is no significant change in the state between the users Um and Ua (NO in step S103 and NO in step S107), the input/output control unit 105 keeps the state of the communication via the network N1.

(Step S111)

Then, as long as the user Um does not issue an instruction to terminate the communication via the network N1 with the user Ua (NO in step S111), the input/output control unit 105 continues performing the processing associated with the determination on whether the users Um and Ua are in the face-to-face state and performing the control on the communication via the network N1 based on the determination result. Then, in the case where the user Um issues an instruction to terminate the communication via the network N1 with the user Ua through the input unit 23 (YES in step S111), the input/output control unit 105 terminates the communication via the network N1 with the information processing apparatus 10a.

An example of the series of processing procedures of the information processing system according to the present embodiment is described above with reference to FIG. 4.

<4. Modifications>

Subsequently, modifications of the information processing system according to the present embodiment will be described.

[4.1. First Modification: Example of Control of Communication Among Three or More Users]

An example of the operation in a case where the information processing system according to the present embodiment controls interactive communication among three or more users is now described as a first modification. In one example, FIG. 5 is a diagram illustrated to describe an example of the operation of the information processing system according to the first modification, and illustrates an example of a case where users Um, Ua, and Ub perform interactive communication.

Figure 5:
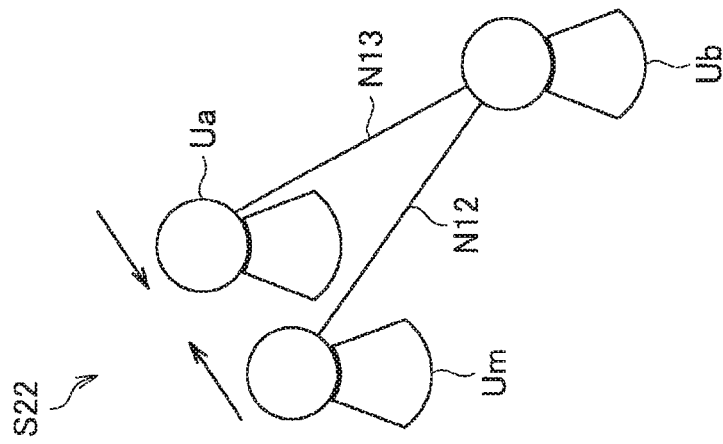
FIG. 5 is a diagram illustrated to describe an example of an operation of an information processing system according to a first modification.
Figure 5:
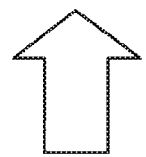
Figure 5:
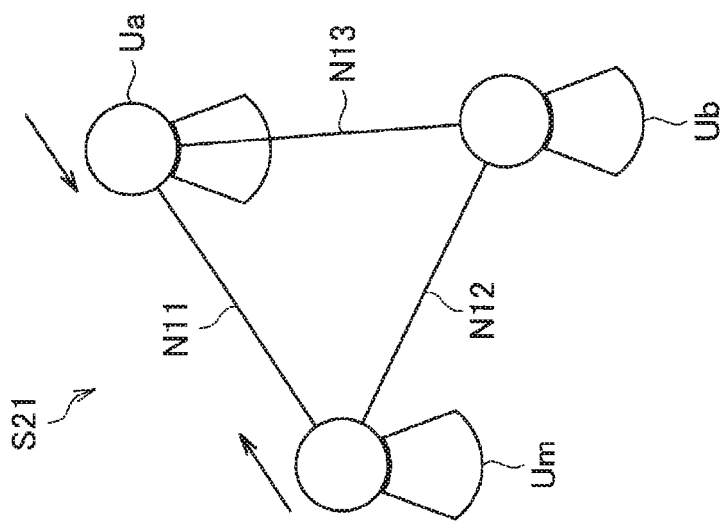

In FIG. 5, reference numeral N11 schematically denotes a network between the information processing apparatuses 10 held by the users Um and Ua. In addition, reference numeral N12 schematically denotes a network between the information processing apparatuses 10 held by the users Um and Ub. Similarly, reference numeral N13 schematically denotes a network between the information processing apparatuses 10 held by the users Ua and Ub. Moreover, in the example illustrated in FIG. 5, the illustration of the information processing apparatus 10 held by each of the users Um, Ua, and Ub is omitted to make the description easier to understand. In addition, in the following description, the information processing apparatuses 10 held by the users Um, Ua, and Ub may be described as information processing apparatuses 10m, 10a, and 10b, respectively, in some cases, in the case of explicitly distinguishing the information processing apparatuses 10m, 10a, and 10b from each other.

In one example, in FIG. 5, the state denoted by reference numeral S21 is a state in which the direct communication is difficult among the users Um, Ua, and Ub. In this case, in one example, the information processing apparatuses 10m and 10a activate the communication via the network N11. This makes it possible for the users Um and Ua to communicate interactively via the network N11 using the information processing apparatuses 10 held by the respective users. Similarly, the information processing apparatuses 10m and 10b activate the communication via the network N12. In addition, the information processing apparatuses 10a and 10b activate the communication via the network N13. In this way, in the state S21, the users Um, Ua, and Ub communicate interactively via the networks.

Next, the state indicated by reference numeral S22 will be described. The state S22 indicates a state in which the users Um and Ua face each other after the state S21 and it is possible to perform the direct communication. In such a case, the information processing apparatuses 10m and 10a suppress the communication via the network N11 between the users Um and Ua.

On the other hand, in the state S22, the users Um and Ub remain in the non-face-to-face state. Thus, the information processing apparatus 10m remains in the state in which the communication via the network N12 between the users Um and Ub is activated. Similarly, the users Ua and Ub remain in the non-face-to-face state, and thus the information processing apparatus 10a remains in the state in which the communication via the network N13 between the users Um and Ub is activated.

Moreover, in a case where the users Um and Ua are apart from each other again after the state S22, the information processing apparatuses 10m and 10a may restart the communication via the network N11 between the users Um and Ua.

Further, in the case where the users Um and Ub are in the face-to-face state, the information processing apparatuses 10m and 10b may suppress the communication via the network N12. Similarly, in the case where the users Ua and Ub are in the face-to-face state, the information processing apparatuses 10a and 10b may suppress the communication via the network N13. In this way, each of the information processing apparatuses 10 may individually control the communication via the network between the users, depending on whether the users are in the face-to-face state.

Figure 6:
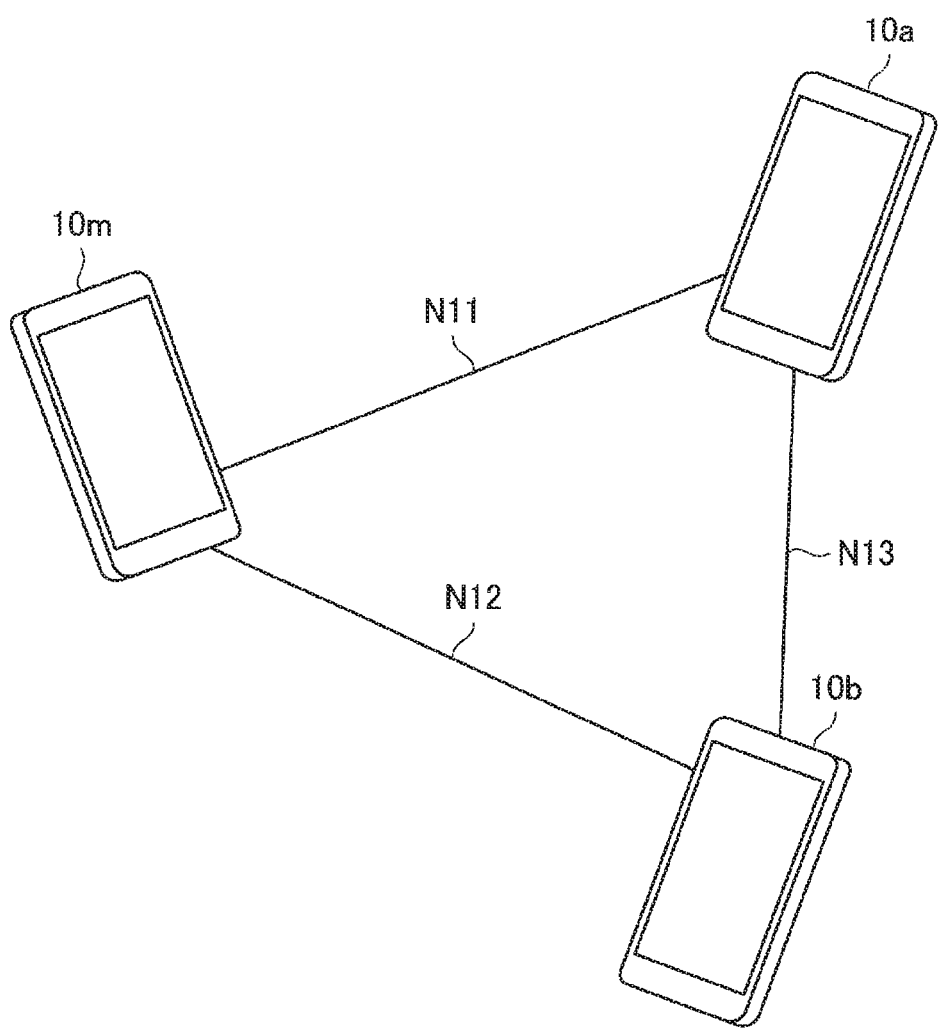
FIG. 6 illustrates an example of a connection relationship between information processing apparatuses in the information processing system according to the first modification.

An example of the connection relationship among the information processing apparatuses 10m, 10a, and 10b is now described with reference to FIG. 6. FIG. 6 illustrates an example of the connection relationship among the information processing apparatuses 10 in the information processing system according to the first modification. In the example illustrated in FIG. 6, the information processing apparatus 10m establishes the communication via network with each of the information processing apparatuses 10a and 10b.

In the example illustrated in FIG. 6, the information processing apparatus 10m may control the communication with each of the information processing apparatuses 10a and 10b individually. Specifically, the information processing apparatus 10m, in the case of recognizing that the users Um and Ua are in the face-to-face state, may control the operation related to the communication with the information processing apparatus 10a via the network N11. This makes it possible for the information processing apparatus 10m to suppress the communication via the network N11 between the users Um and Ua. Similarly, the information processing apparatus 10m, in the case of recognizing that the users Um and Ub are in the face-to-face state, may control the operation related to the communication with the information processing apparatus 10b via the network N12. This makes it possible for the information processing apparatus 10m to suppress the communication via the network N12 between the users Um and Ub. Moreover, it is apparent that the control as described above is similarly applicable to the information processing apparatuses 10a and 10b.

Figure 7:
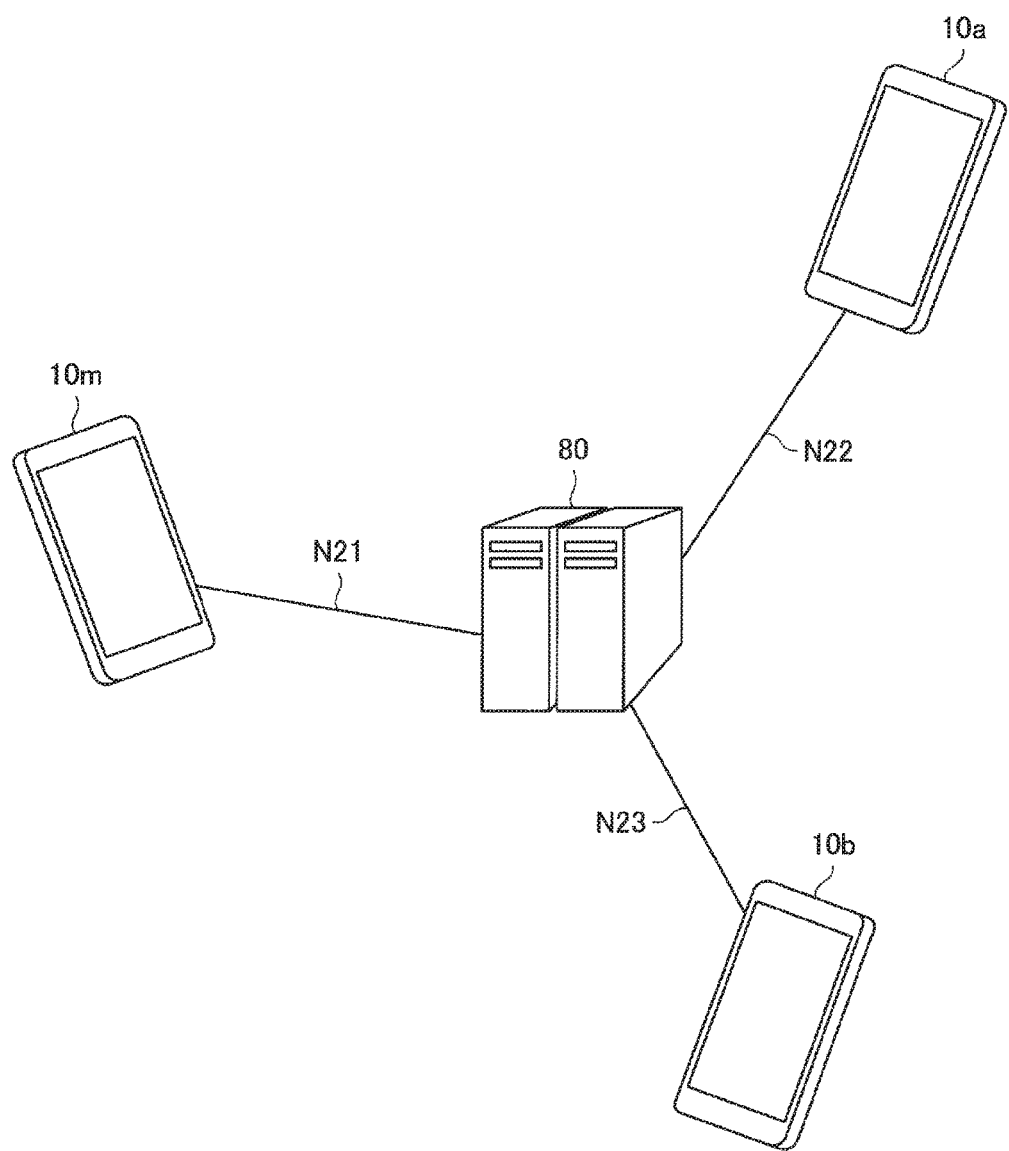
FIG. 7 illustrates another example of the connection relationship between information processing apparatuses in the information processing system according to the first modification.

Further, another example of the connection relationship among the information processing apparatuses 10m, 10a, and 10b is described with reference to FIG. 7. FIG. 7 illustrates another example of the connection relationship among the information processing apparatuses 10 in the information processing system according to the first modification. In the example illustrated in FIG. 7, a server 80 mediates the communication among the information processing apparatuses 10m, 10a, and 10b. Moreover, in FIG. 7, reference numeral N21 schematically denotes a network between the information processing apparatus 10m and the server 80. Similarly, reference numeral N22 schematically denotes a network between the information processing apparatus 10a and the server 80. In addition, reference numeral N23 schematically denotes a network between the information processing apparatus 10b and the server 80.

In the example illustrated in FIG. 7, the information processing apparatus 10m receives the data (information for communication) that is transmitted from each of the information processing apparatuses 10a and 10b from the server 80. Thus, in one example, the information processing apparatus 10m determines from which of the information processing apparatuses 10a and 10b the data is transmitted (i.e., which data is used for communication with either the user Ua or Ub) on the basis of the information indicating the sender included in the data received from the server 80.

Specifically, the information processing apparatus 10m, in the case of recognizing that the users Um and Ua are in the face-to-face state, may suppress output of the data whose sender is the information processing apparatus 10a among the data received from the server 80. This makes it possible for the information processing apparatus 10m to suppress the communication via the network N11 between the users Um and Ua. Similarly, the information processing apparatus 10m, in the case of recognizing that the users Um and Ub are in the face-to-face state, may suppress output of the data whose sender is the information processing apparatus 10b among the data received from the server 80. This makes it possible for the information processing apparatus 10m to suppress the communication via the network N12 between the users Um and Ub. Moreover, it is apparent that the control as described above is applicable to the information processing apparatuses 10a and 10b in a similar way.

Further, in the case of the example illustrated in FIG. 7 as another example, the server 80 may play a significant role in controlling the transmission and reception of data among the information processing apparatuses 10m, 10a, and 10b.

In a specific example, it is assumed that the server 80 recognizes that the users Um and Ua are in the face-to-face state on the basis of a notification issued by at least one of the information processing apparatuses 10m and 10a. In this case, the server 80 may suppress the transmission and reception of information between the information processing apparatuses 10m and 10a. This makes it possible to suppress the communication via the network N11 between the users Um and Ua. Similarly, the server 80, in the case of recognizing that the users Um and Ub are in the face-to-face state, may suppress the transmission and reception of information between the information processing apparatuses 10m and 10b. In addition, the server 80, in the case of recognizing that the users Ua and Ub are in the face-to-face state, may suppress the transmission and reception of information between the information processing apparatuses 10a and 10b.

The control as described above makes it possible for the users Um, Ua, and Ub to continue communicating with one another in a more preferred mode without being conscious of whether the user faces his/her communication partner, even in a situation in which their state are changed frequently between the face-to-face state and the non-face-to-face state.

As the first modification, an example of the operation in the case where the information processing system according to the present embodiment controls interactive communication among three or more users is described above with reference to FIGS. 5 to 7.

[4.2. Second Modification: Example of State Notification and Control of Communication]

Subsequently, another example of various operations related to the notification of the state of interactive communication between a plurality of users issued by the information processing apparatus 10 and the control on the communication will be described as a second modification.

Figure 8:
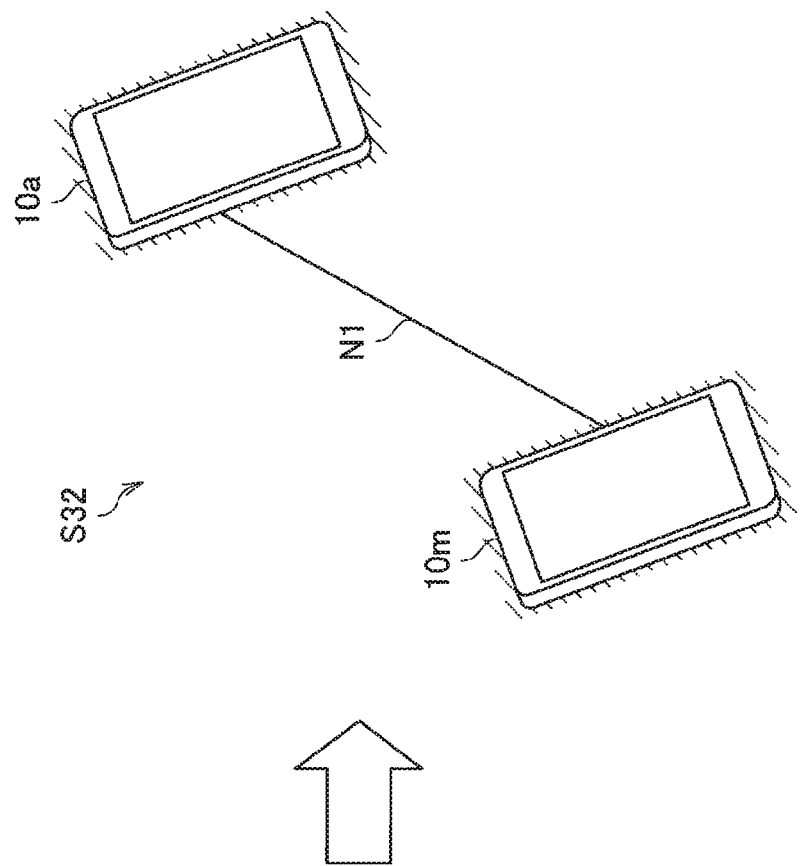
FIG. 8 is a diagram illustrated to describe an example of an information processing system according to a second modification.
Figure 8:
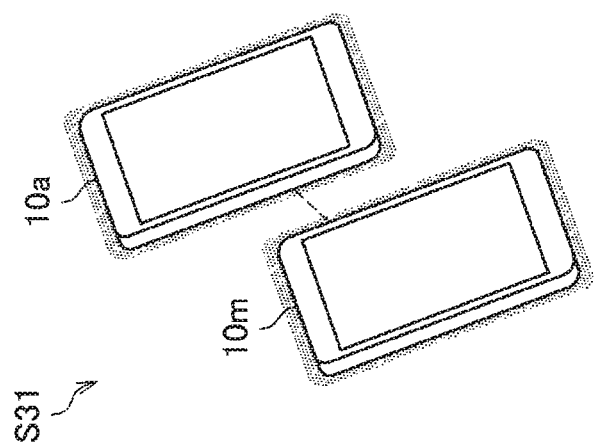

In one example, FIG. 8 is a diagram illustrated to describe an example of the information processing system according to the second modification, and illustrates schematically the states of the information processing apparatuses 10m and 10a in the case where the users Um and Ua communicate with each other interactively.

In the example illustrated in FIG. 8, the information processing apparatuses 10m and 10a notify their users that interactive communication is being executed (i.e., connected) by lighting or blinking a light emitting device such as light emitting diode (LED) in a case where the users holding the information processing apparatuses 10m and 10a start interactive communication with each other In other words, there may be the case where processing of detection of whether the users Um and Ua are in the face-to-face state and control on the communication via the network N11 depending on the detection result is being executed. In this case, the information processing apparatuses 10m and 10a notify the users that the processing is being executed by lighting or blinking the light emitting device. In addition, in the example illustrated in FIG. 8, the information processing apparatuses 10m and 10a notify the users holding the information processing apparatuses 10m and 10a whether the users are in the face-to-face state, in one example, by controlling the mode of lighting or blinking the light emitting device depending on whether the users Um and Ua are in the face-to-face state.

In one example, in FIG. 8, reference numeral S31 schematically denotes a state in which the direct communication between the users Um and Ua is allowed (i.e., the face-to-face state). In addition, reference numeral S32 schematically denotes a state in which the users Um and Ua are apart from each other and the direct communication between the users Um and Ua is difficult (i.e., the non-face-to-face state).

In other words, in state S31, the users Um and Ua are in the face-to-face state, so the information processing apparatuses 10m and 10a suppress the communication via the network N11 between the users Um and Ua. In addition, in state S32, the users Um and Ua are in the non-face-to-face state, so the information processing apparatuses 10m and 10a activate the communication via the network N11 between the users Um and Ua.

An operation in which the information processing apparatus 10m notifies the user Um of information is now described by focusing on the information processing apparatus 10m. Moreover, the operation to be described below is similarly applied to the case where the information processing apparatus 10a notifies the user Ua of information.

In one example, in the example illustrated in FIG. 8, the information processing apparatus 10m lights or blinks the light emitting device in different modes between the state S31 (face-to-face state) and the state S32 (non-face-to-face state). This makes it possible for the user Um to determine whether the communication via the network N11 with the user Ua is activated depending on whether light emitting device is lighted or blinked.

Moreover, the mode in which the information processing apparatus 10m lights or blinks the light emitting device is not specifically limited, as long as it is possible to determine whether the user Um is in the state of S31 or in the state of S32. In a specific example, the information processing apparatus 10m may light or blink the light emitting device with different colors between the states of S31 and S32. In addition, in another example, the information processing apparatus 10m may light or blink the light emitting device with different light emission patterns between the states of S31 and S32.

Further, as long as the user Um is able to determine whether interactive communication with the user Ua is activated or to determine whether the communication via the network N11 with the user Ua is activated, a method of allowing the information processing apparatus 10*m* to notify the user Um of the information is not specifically limited.

In a specific example, in the case where the interactive communication between the users Um and Ua is started, the information processing apparatus 10*m* may notify the user Um that the interactive communication is being executed by outputting acoustic information such as sound effects and background music (BGM). In a more specific example, in the case where the interactive communication is being executed, the information processing apparatus 10*m* may output acoustic information used to remind the user Um that the communication is being executed among the plurality of users.

Moreover, in the case of notifying of the information by outputting the acoustic information, the information processing apparatus 10*m* may always output the acoustic information or may output the acoustic information periodically at predetermined intervals.

Further, the information processing apparatus 10*m* may notify the user Um whether the communication via the network N11 with the user Ua is activated, by outputting different pieces of acoustic information between the states of S31 (face-to-face state) and S32 (non-face-to-face state).

Further, in the case where the transition from the face-to-face state (state of S31) to the non-face-to-face state (state of S32) is performed, the information processing apparatus 10*m* may notify the user Um whether to activate the communication via the network N11 with the user Ua.

In a specific example, when the users Um and Ua are in the non-face-to-face state (state of S32), the information processing apparatus 10*m* may light or blink the light emitting device in a mode similar to the information processing apparatus 10*a* in the case where the communication via the network N11 is set to be activated.

In a more specific example, the information processing apparatus 10*m* may notify the user Um that the communication via the network N11 is to be activated by causing the light emitting device of the information processing apparatus 10*m* to emit light in synchronization with the light emitting device of the information processing apparatus 10*a*, when it comes to the non-face-to-face state. In this case, the user Um can check that the light emitting devices of the information processing apparatuses 10*m* and 10*a* are emitting light in synchronization with each other at the time when the user Um faces the user Ua. Thus, it is possible for the user Um to recognize that the communication with the user Ua can be continued even in the case where they are in the non-face-to-face state.

Figure 9:
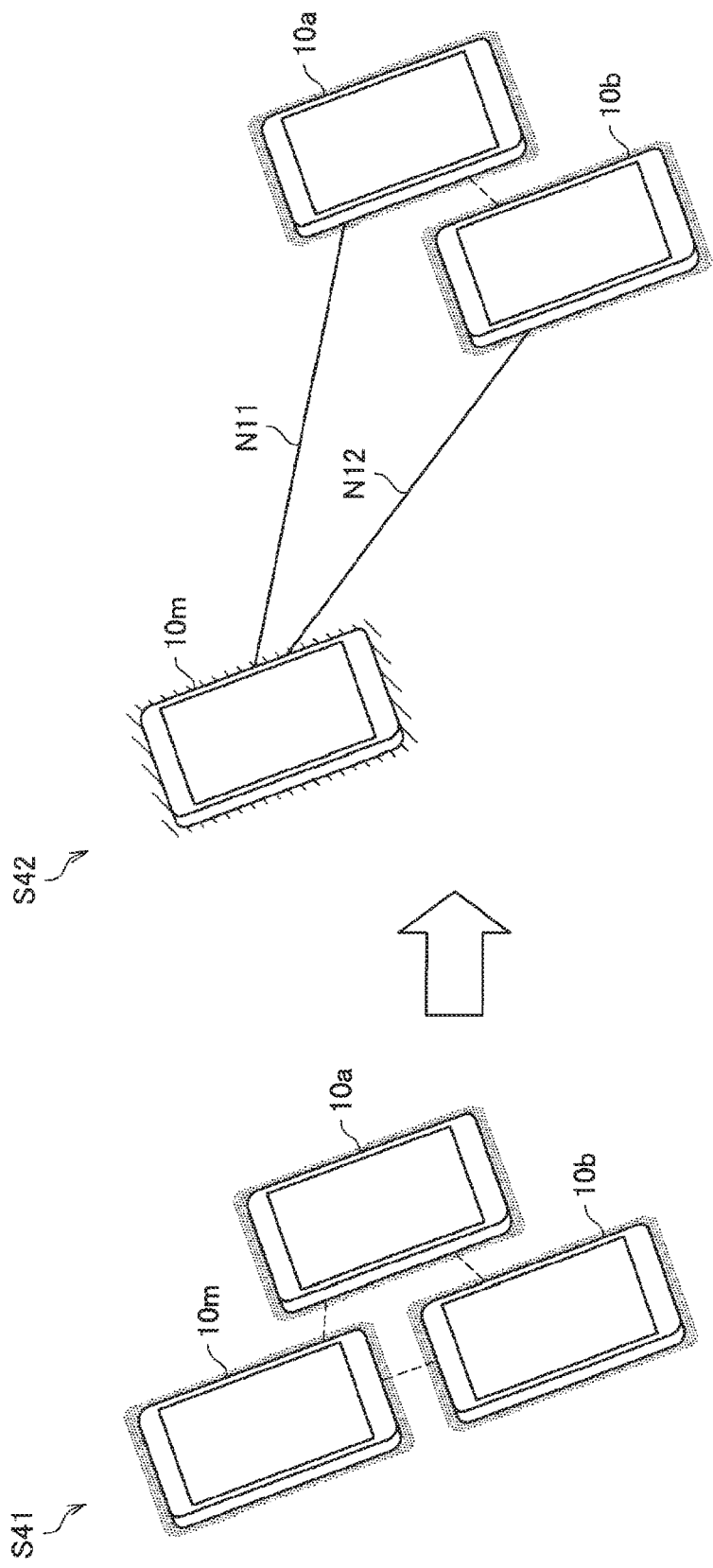
FIG. 9 is a diagram illustrated to describe an example of an information processing system according to the second modification.

Subsequently, an example of the operation of the information processing apparatus 10 in a case where three or more users interactively communicate with one another will be described with reference to FIG. 9. FIG. 9 is a diagram illustrated to describe an example of the information processing system according to the second modification, and schematically illustrates the states of the information processing apparatuses 10*m,* 10*a,* and 10*b* in the case where the users Um, Ua, and Ub interactively communicate with one another.

In the example illustrated in FIG. 9, the information processing apparatuses 10 notify their users that interactive communication is being executed by lighting or blinking a light emitting device in a case of starting interactive communication with other users, which is similar to the example illustrated in FIG. 8. Further, in the example illustrated in FIG. 9, the information processing apparatus 10 notifies its user whether the user is in the face-to-face state, in one example, by controlling the mode of lighting or blinking the light emitting device depending on whether a plurality of users to interactively communicate with are in the face-to-face state.

In one example, in FIG. 9, reference numeral S41 schematically denotes a state in which the direct communication among the users Um, Ua, and Ub is allowed (i.e., the face-to-face state). In addition, reference numeral S42 schematically denotes a state in which the user Um is apart from the users Ua and Ub and the direct communications between the users Um and Ua and the direct communications between the users Um and Ub are difficult (i.e., the non-face-to-face state).

In one example, when focusing on the operation of the information processing apparatus 10*m,* in the state of S41, the users Um, Ua, and Ub are in the face-to-face state, so the information processing apparatus 10*m* suppresses the communication via the network between the user Um and the users Ua/Ua. In addition, in state of S42, the user Um and each of the users Ua and Ua are in the non-face-to-face state, so the information processing apparatus 10*m* activates the communication via the network N11 between the users Um and Ua and the communication via the network N12 between the users Um and Ub.

Moreover, as illustrated in FIG. 9, the information processing apparatus 10*m* may notify the user Um whether the user Um is in the face-to-face state (in other words, the communication via the network is activated) by causing the light emitting device to emit light in different modes between the states of S41 (face-to-face state) and S42 (non-face-to-face state).

Further, in the example illustrated in FIG. 9, even in the case where the users Um, Ua, and Ub are in the non-face-to-face state, the communication via the network can be activated to continue communication. Thus, the information processing apparatus 10*m* may notify the user Um that the communication via the network is activated when it comes to the non-face-to-face state, by causing the light emitting device to emit light in synchronization with the information processing apparatuses 10*a* and 10*b* at least in the state of S41 (face-to-face state).

Moreover, in the case where the users Um, Ua, and Ub are in the non-face-to-face state, the information processing apparatus 10*m* may perform control so that the communication via the network is activated only between some users.

In a specific example, in the case where the user Um and the users Ua/Ub are apart from each other and they are in the non-face-to-face state, the information processing apparatus 10*m* may activate the communication via the network only between the users Um and Ua (i.e., communication via the network N11). In this case, the information processing apparatus 10*m* may notify the user Um that the communication via the network is activated only between the users Um and Ua when it comes to the non-face-to-face state, by causing the light emitting device to emit light in synchronization with only the information processing apparatus 10*a* in the state of S41 (face-to-face state).

Moreover, in the case of being in the non-face-to-face state, a partner whose communication via the network is activated may be changed as appropriate on the basis of the operation made by the user. In a specific example, the information processing apparatus 10*m* may switch a partner whose communication via the network is activated from the user Ua to the user Ub in the case of being in the non-face-to-face state, on the basis of an instruction issued by the user Um. In addition, addition of a user who is a target of interactive communication or exclusion of some users from targets of interactive communication can be executed as appropriate.

Further, different operations may be assigned to the switching of the partner whose communication via the network is activated in the case of being in the non-face-to-face state and to each of addition and exclusion of a user who is a target of interactive communication. In a specific example, the operation of bringing the plurality of information processing apparatuses 10 into contact with or close to each other may be assigned to the processing associated with the addition of the user who is a target of interactive communication. In addition, in the case of being in the non-face-to-face state, the operation of swinging the information processing apparatus 10 may be assigned to the processing associated with the switching of a partner whose communication via the network is activated.

Even in such a case, the information processing apparatus 10m may notify the user Um of a partner whose communication via the network is activated in the non-face-to-face state, in one example, by controlling the light emission mode or the like of the light emitting device. This makes it possible for the user Um to recognize the partner on the basis of the notification information issued by the information processing apparatus 10m (e.g., light emission mode of the light emitting device) even in the case where the partner whose communication via the network is activated in the non-face-to-face state is appropriately changed depending on the situation.

As the second modification, an example of the operation of the information processing apparatus 10 in the case where the information processing apparatus 10 notifies its user of the state of the interactive communication between a plurality of users is described above with reference to FIGS. 8 and 9.

[4.3. Third Modification: Example of Control of Communication Via Network]

In the information processing system according to the embodiment described above, an example of the case in which the respective information processing apparatuses 10 control the communication via the network among a plurality of users depending on whether the users who are targets of interactive communication are in the face-to-face state is described. On the other hand, the information processing apparatus 10 may control the communication between the users more finely b not only by using the condition as to whether the users are in the face-to-face state but also by combining the condition with another condition. Thus, an example in which the information processing apparatus 10m held by the user Um controls the communication via the network between the user Um and other users is described below by focusing on the operation of the information processing apparatus 10m.

(Example of Control Depending on External Environment)

In one example, even in the case where the user Um and the user Ua are in the face-to-face state, the direct communication between the users Um and Ua is difficult in some cases. In a specific example, in a case where the influence of environmental sound (noise) from the external environment is large, one of the users is difficult to hear the voice uttered from the other user in some cases even when the users Um and Ua are facing each other.

Thus, in one example, the information processing apparatus 10m, when determining that the users Um and Ua are in the face-to-face state, can maintain the communication via the network in the case where the signal-to-noise ratio (SN ratio) of environmental sound to the voice uttered from the user Ua is lower than a threshold value (or sound volume of the environmental sound exceeds the threshold value). The control as described above makes it possible for the user Um to hear the voice uttered by the user Ua on the basis of the communication via the network even under circumstances where it is difficult to directly hear the voice uttered by the user Ua due to the influence of environmental sound (noise).

(Example of Control Based on User's Operation)

Further, the information processing apparatus 10m may be configured so that the user Um can intentionally suppress the communication via the network at any timing on the basis of various operations. In other words, the information processing apparatus 10m, in the case of receiving a predetermined operation from the user Um, the information processing apparatus 10m may suppress the communication via the network with other users.

In a specific example, the information processing apparatus 10m, in the case of detecting a predetermined operation performed by the user Um on a predetermined device, may suppress the communication via the network. In a more specific example, in a case where the information processing apparatus 10m detects that a predetermined operation such as "grip" and "cover" is performed on a predetermined device such as a microphone (a sound collection device) or the like by the user Um, the information processing apparatus 10m may suppress the communication via the network. Moreover, a method of detecting a predetermined operation is not specifically limited as long as the information processing apparatus 10m can detect a predetermined operation such as "grip" or "cover" on a predetermined device. In a specific example, the information processing apparatus 10m may include various detection units such as a touch sensor, an illuminance sensor, and a humidity sensor to detect a predetermined operation on a predetermined device.

It is apparent that the information processing apparatus 10m, in the case of detecting a predetermined operation performed by the user Um on a predetermined device, may activate (restart) the communication via the network. In a more specific example, the information processing apparatus 10m, in the case of detecting that the user Um releases his/her hand that has gripped (or his/her hand that has covered) a predetermined device such as a microphone from the device, may restart the communication via the network that has been previously suppressed.

Further, in another example, the information processing apparatus 10m, in the case of detecting that a predetermined device such as a headphone (or an earphone) or a microphone is removed (transition to a state in which it is not attached), may suppress the communication via the network. In addition, in a case where a predetermined device such as a headphone (or an earphone) or a microphone is attached again, the information processing apparatus 10m may restart the communication via the network that has been previously suppressed.

Further, in another example, the information processing apparatus 10m, in the case of detecting a predetermined gesture operation by the user Um, may suppress the communication via the network. It is apparent that the information processing apparatus 10m may restart the communication via the network that has been previously suppressed in the case of detecting the predetermined gesture operation by the user Um.

Further, the information processing apparatus 10m may receive a user's operation on a predetermined operation device such as buttons or a predetermined user interface (UI) to suppress or activate (restart) the communication via the network.

In a specific example, the information processing apparatus 10m may present a list of other users who are partners of interactive communication to the user Um and may present information indicating whether each of the other users is in the non-face-to-face state. In addition, in this event, the information processing apparatus 10m may present information indicating the setting with regard to activation/deactivation of the communication with the other users who are partners of interactive communication via the network in the case where the transition from the face-to-face state to the non-face-to-face state is performed.

Further, the information processing apparatus 10m may update the setting regarding interactive communication with other users to be operated on the basis of the operation performed by the user Um in the case of receiving the user Um's operation with respect to the information regarding the other users who are partners of interactive communication, which is presented to the user Um. Moreover, an example of the setting regarding interactive communication includes the setting with regard to activation/deactivation of the communication via the network in the case where the transition from the face-to-face state to the non-face-to-face state is performed as described above.

(Example of Graphical User Interface (GUI))

Figure 10:
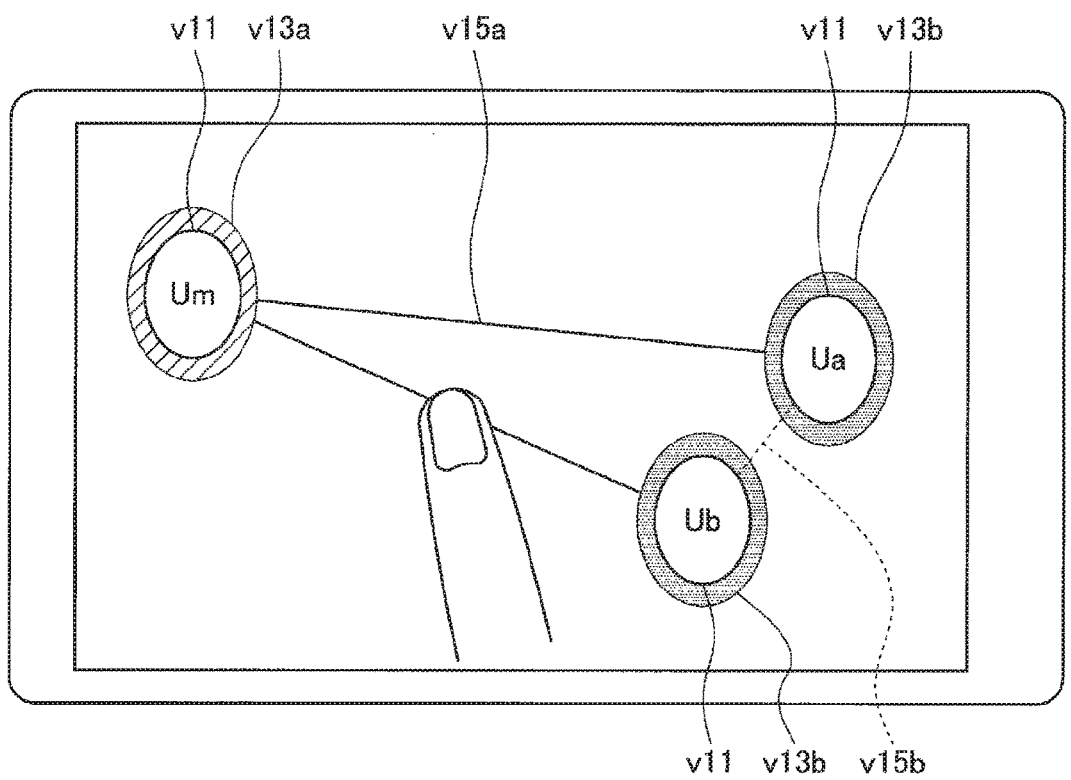
FIG. 10 is a diagram illustrated to describe one mode of an information processing apparatus according to the second modification.

Subsequently, an example of the GUI of the information processing apparatus 10 will be described with reference to FIG. 10. FIG. 10 is a diagram illustrated to describe one mode of the information processing apparatus 10 according to the second modification, and illustrates an example of a GUI presented by the information processing apparatus 10 to the user who holds the information processing apparatus 10.

In the example illustrated in FIG. 10, the information processing apparatus 10 presents the state of interactive communication among the users Um, Ua, and Ub on an operation screen v10. Moreover, in the example illustrated in FIG. 10, it is assumed that the users Ua and Ub are in the face-to-face state and the user Um and each of the users Ua and Ub are in the non-face-to-face state.

In the example illustrated in FIG. 10, the information processing apparatus 10 schematically presents the users Um, Ua, and Ub who are targets of interactive communication as a node v11 on the operation screen v10.

Furthermore, the information processing apparatus 10 highlights each of the nodes v11 in different modes depending on whether a user corresponding to a relevant node and other users are in the face-to-face state or the non-face-to-face state. In one example, in the case of the example illustrated in FIG. 10, the information processing apparatus 10m highlights each of the nodes v11 by using one of display objects v13a and v13b shown as edges with different colors depending on whether the user corresponding to the node v11 is in the face-to-face state or the non-face-to-face state with other users. Moreover, in the following description, the display objects v13a and v13b used to highlight the respective nodes v11 are simply referred to as "display objects v13" in some cases unless such a distinction is necessary.

In one example, in the example illustrated in FIG. 10, the user Um is in the non-face-to-face state with each of the users Ua and Ub. Thus, the information processing apparatus 10 shows that the user Um and each of the users Ua and Ub are in the non-face-to-face state by highlighting the node v11 corresponding to the user Um using the display object v13a.

Further, in the example illustrated in FIG. 10, the users Ua and Ub are in the face-to-face state. Thus, the information processing apparatus 10 shows that the users Ua and Ub are in the face-to-face state by highlighting the nodes v11 corresponding to the respective users Ua and Ub using the display objects v13b.

Further, the information processing apparatus 10 may show that the communication via the network is to be activated/deactivated by using the blinking pattern of the display object v13 associated with the node v11 corresponding to each user when the corresponding users are in the non-face-to-face state.

In a specific example, the description will be given by focusing on the information processing apparatus 10 that activates the communication via the network between the users Ua and Ub in the case where the state between the users Ua and Ub is changed from the face-to-face state to the non-face-to-face state. In this case, the information processing apparatus 10 synchronously blinks the display objects v13 between the nodes v11 corresponding to the respective users Ua and Ub. This makes it possible for the user holding the information processing apparatus 10 to recognize that the communication via the network is activated and the communication between the users Ua and Ub is continued even in the case where the users Ua and Ub are in the non-face-to-face state.

Further, the information processing apparatus 10 connects the nodes v11 to each other by one of links v15a and v15b shown in different modes depending on the mode of the communication between the users indicated by the node v11. Moreover, in the following description, the links v15a and v15b are sometimes simply referred to as "links v15", unless such a distinction is necessary.

Specifically, the link v15a indicates that the communication via the network is activated between the users connected by the link v15a. In one example, in the example illustrated in FIG. 10, the user Um and each of the users Ua and Ub are in the non-face-to-face state, and the communication via the network is activated between the user Um and each of the users Ua and Ub. Thus, the information processing apparatus 10 connects the node v11 indicating the user Um and the node v11 indicating each of the users Ua and Ub by the link v15a.

Further, the link v15b indicates that the communication via the network is suppressed between the users connected by the link v15b. In one example, in the example illustrated in FIG. 10, the users Ua and Ub are in the face-to-face state, and the communication via the network is suppressed between the users Ua and Ub. Thus, the information processing apparatus 10m connects the node v11 indicating the user Ua and the node v11 indicating the user Ub by the link v15b.

Further, the information processing apparatus 10 may receive an operation performed by the user Um on each display object presented on the operation screen v10 and may control the operation associated with the communication between the users on the basis of the contents of the operation.

In one example, the information processing apparatus 10 may receive an operation performed on the link v15 that connects the nodes v11 corresponding to the respective users to each other, and may control the operation associated with the communication via the network between the corresponding users.

In a specific example, it is assumed that the information processing apparatus 10m held by the user Um receives the operation (e.g., tap operation or the like) performed by the user Um on the link v15a (i.e., the link v15 indicating that the communication via the network is activated) that connects the nodes v11 corresponding to the users Um and Ub to each other. In this case, in one example, the information processing apparatus 10m may suppress (stop) the communication via the network between the users Um and Ub even in the case where the users Um and Ub are in the non-face-to-face state. In addition, in this event, the information processing apparatus 10m may update the display screen v10 such that the nodes v11 corresponding to the users Um and Ub are connected to each other by the link v15b (i.e., the link v15 indicating that the communication via the network is suppressed) as the communication via the network between the users Um and Ub is suppressed.

Further, in another example, it is assumed that the information processing apparatus 10a held by the user Ua recognizes the operation performed by the user Ua on the link v15b (i.e., the link v15 indicating that the communication via the network is suppressed) that connects the nodes v11 corresponding to the users Ua and Ub to each other. In this case, in one example, the information processing apparatus 10a may activate the communication via the network between the users Ua and Ub even when the users Ua and Ub are in the face-to-face state. In addition, in this event, the information processing apparatus 10a may update the display screen v10 such that the nodes v11 corresponding to the users Ua and Ub are connected to each other by the link v15a (i.e., link v15 indicating that the communication via the network is activated) with the activation of the communication via the network between the users Ua and Ub.

Moreover, each of the information processing apparatuses 10 may limit the range of targets to be controlled in the case of receiving an operation performed on the operation screen v10. In a specific example, in the case where the information processing apparatus 10 receives an operation performed on the operation screen v10 by a user who holds the information processing apparatus 10, the information processing apparatus 10 may set only the processing to be led by the information processing apparatus 10, as a target to be controlled. In a more specific example, the information processing apparatus 10m held by the user Um may set only the communication between the user Um and other user as a target to be controlled, and may exclude the communication between users other than the user Um from targets to be controlled.

Further, in another example, the information processing apparatus 10 may add or exclude a user who is a target of interactive communication on the basis of an operation performed by the user U who holds the information processing apparatus 10.

In a specific example, in the communication among three or more users, not all users are necessarily communicating with each other interactively. In one example, in a situation where the user Um communicates interactively with the user Ua, the user Um may concurrently communicate with another user Uc. On the other hand, in this event, the user Ua and the user Uc are not necessarily in communication with each other.

Under such circumstances, in one example, the information processing apparatus 10m held by the user Um may newly add the user Uc to the interactive communication between the user Um and Ua on the basis of the instruction from the user Um. In this case, the information processing apparatus 10m newly adds the node v11 corresponding to the user Uc on the operation screen v10, and may blink the node v11 corresponding to the user Uc in synchronization with the display objects v13 between the nodes v11 corresponding to the users Um and Ua. This makes it possible for the user Um to recognize that the user Uc is newly added to the communication between the users Um and Ua.

Further, the information processing apparatus 10m held by the user Um may exclude the user Uc from the interactive communication among the users Um, Ua, and Uc on the basis of the operation from the user Um. In this case, the information processing apparatus 10m may blink the display object v13 in different modes between the node v11 corresponding to the user Uc and the nodes v11 corresponding to the users Um and Ua (e.g., asynchronous blinking is possible). This makes it possible for the user Um to recognize that the user Uc is excluded from the communication among the users Um, Ua, and Uc.

The configuration as described above makes it possible for each of the users to check the state of the communication between the users who are targets of interactive communication through the operation screen v10 presented by the their own information processing apparatuses 10. In addition, it is possible for each of the users to instruct their own information processing apparatuses 10 to control the communication between the users by using the operation performed on the operation screen v10 presented by their own information processing apparatuses 10.

As the second modification, another example of various operations related to the notification issued by the information processing apparatus 10 with regard to the state of interactive communication between a plurality of users or the control of the communication is described above with reference to FIGS. 8 to 10.

<5. Illustrative Examples>

Subsequently, illustrative examples of the information processing system according to the present embodiment will be described.

[5.1. First Illustrative Example: Example of Form of Information Processing Apparatus]

As a first illustrative example, an example of the form of the information processing apparatus 10 used in the information processing system according to the present embodiment is now described.

Figure 11:
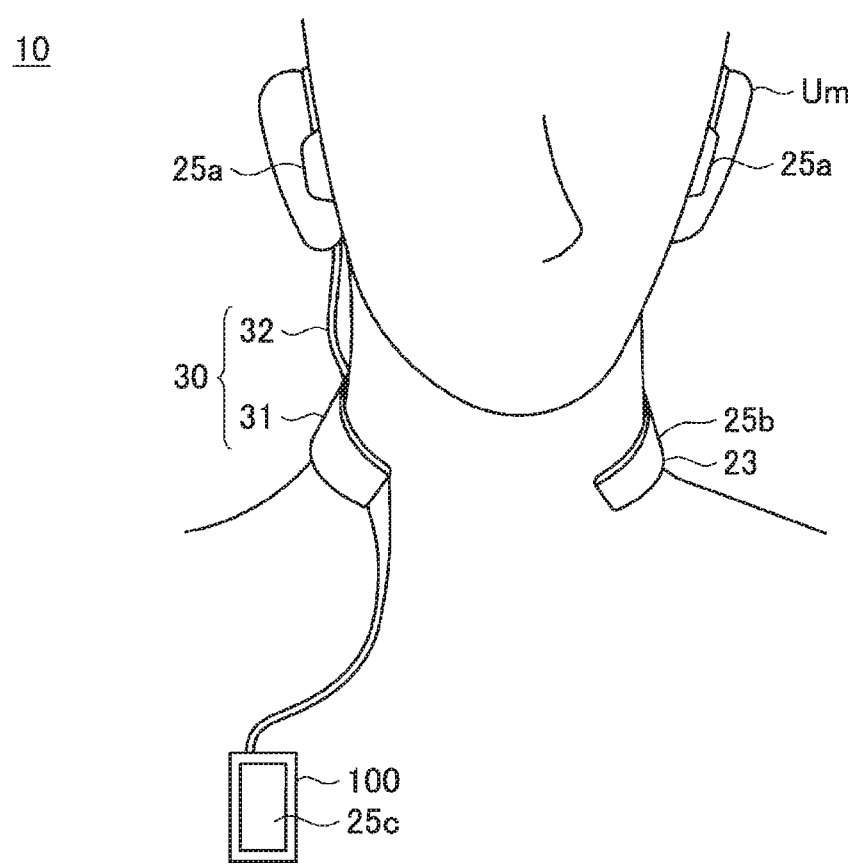
FIG. 11 illustrates an example of a form of the information processing apparatus according to the present embodiment.

In one example, FIG. 11 illustrates an example of the form of the information processing apparatus 10 according to the present embodiment. In the example illustrated in FIG. 11, the information processing apparatus 10 includes a main body unit 100 and an input/output unit 30.

The input/output unit 30 corresponds to an input/output interface (input/output device) of various types of information with respect to the main body unit 100, in one example, for allowing the user Um to communicate with another user via a network. The input/output unit 30 includes, in one example, a holding portion 31 and an earphone portion 32.

The holding portion 31 is configured to be attachable to the neck of the user Um. In a specific example, the holding portion 31 has a shape in which a part of the circumference of the ring is cut and is attached to the neck of the user Um to be worn around the neck of the user Um.

The earphone portion 32 corresponds to an acoustic device such as a so-called earphone, headphone, or the like. The earphone portion 32 includes an output unit 25a for outputting acoustic information and is attached so that the output unit 25a is in the vicinity of the ear of the user Um. In addition, the output unit 25a is connected to the holding portion 31 by a cable for transmitting the acoustic information.

The input unit 23 configured as the sound collection device, such as a so-called microphone, used to collect acoustic information is provided in at least part of the holding portion 31, which is located near the mouth of the user Um in the case where the holding portion 31 is attached to the user Um.

Further, an output portion 25*b* configured as the acoustic device, such as a loudspeaker, used to output acoustic information is provided in at least part of the holding portion 31, which is located near the ear of the user Um in the case where the holding portion 31 is attached to the user Um. Moreover, directivity the output unit 25 b may be controlled such that the acoustic information is output in the direction of the ear of the user Um in the case where the holding portion 31 is attached. This makes it possible for the output unit 25*b* to perform control such that the output destination of the acoustic information is principally the user Um (more preferably, such that the output destination of the acoustic information is limited to the user Um).

The main body unit 100 corresponds to the configuration for executing various functions, in one example, such that the user Um communicates with another user via a network. In one example, among the structural elements of the information processing apparatus 10 illustrated in FIG. 3, the communication unit 101, the determination unit 103, the input/output control unit 105, and the history recording unit 107 can be included in the main body unit 100. In addition, the main body unit 100 may include at least a part (e.g., GPS or the like) of the detection unit 21. In addition, the main body unit 100 may include the storage unit 27.

Further, the main body unit 100 may be provided with an output unit 25*c* configured to display the display information, such as a so-called display or the like. Specifically, the main body unit 100 may notify the user Um of the notification information, in one example, by causing the output unit 25*c* to display the notification information to be notified as display information. In addition, the main body unit 100 may be provided with, in one example, an operation device, such as a touch sensor or the like, for a user to operate the information processing apparatus 10.

Further, the main body unit 100 may be provided with a detection unit configured to detect various states. In a specific example, the main body unit 100 may be provided with a sensor configured to detect a change in the positions and orientations of the main body unit 100, such as an acceleration sensor and an angular velocity sensor (gyro sensor). Such a configuration makes it possible for the main body unit 100 to recognize, in one example, whether the user is moving, on the basis of the output from each sensor.

Further, in another example, the main body unit 100 may be provided with a configuration such as GPS for acquiring position information. Such a configuration makes it possible for the main body unit 100 to recognize the detected position information as information regarding the position of a user who holds the main body unit 100.

Moreover, as long as the user Um can hold the main body unit 100, the configuration of the configuration of the main body unit 100 (eventually the information processing unit 10) or the way in which the user Um holds the main body unit 100 is not specifically limited.

Figure 12:
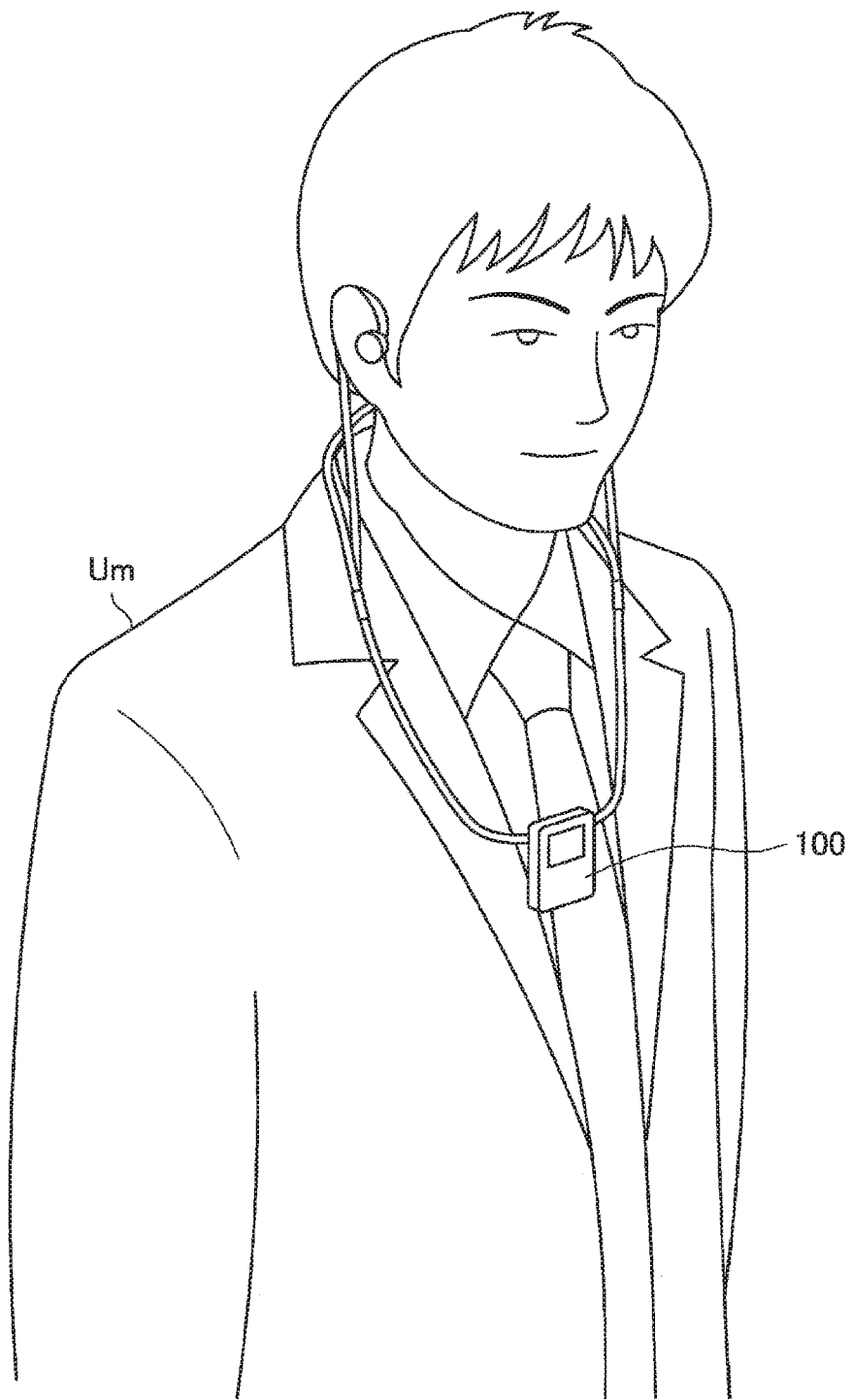
FIG. 12 is a diagram illustrated to describe one mode of an information processing apparatus according to an illustrative example.

In one example, FIG. 12 is a diagram illustrated to describe one mode of the information processing apparatus 10 according to the illustrative example, and illustrates an example of a case where the user Um holds the main body unit 100 by attaching the main body unit 100 to a part of the body of the user Um.

More specifically, FIG. 12 illustrates an example of a case where the information processing apparatus 10 is configured as a so-called pendant type wearable device, which is suspended from the user's neck. That is, in the example illustrated in FIG. 12, the user Um wears the main body unit 100 having a shape simulating a pendant by hanging the main body unit 100 around the neck.

Moreover, the form of the information processing apparatus 10 illustrated in FIGS. 11 and 12 is merely an example, and as long as it can be configured to be carried by the user and it allows the communication between users by using the information processing apparatus 10, the form of the information processing apparatus 10 is not limited.

In a specific example, the information processing apparatus 10 may be configured as a so-called wearable device that can be used by being worn on a part of the body of the user. In a more specific example, the information processing apparatus 10 may be configured, in one example, as a wristwatch type (or wristband type) wearable device configured to be attachable to the user's arm.

Further, in another example, the information processing apparatus 10 may be configured to be attachable to the user's head. An example of such an information processing apparatus 10 can include, in one example, a so-called head mounted display (HMD). In addition, in another example, the information processing apparatus 10 may be configured as an eyewear type (in other words, eyeglass type) wearable device. In addition, in another example, the information processing apparatus 10 itself may be configured as a headphone, an earphone, a headset, a hearing aid, or the like. In this case, in one example, in the example illustrated in FIGS. 11 and 12, the configuration corresponding to the main body unit 100 may be built in the holding portion 31 or the earphone portion 32.

Further, the information processing apparatus 10 may be configured to be attachable to, in one example, a belonging item carried by a user, such as a so-called key holder.

It is apparent that the information processing apparatus 10 may be configured as a so-called smartphone or a tablet terminal as illustrated in FIG. 1.

Further, the information processing apparatus 10 may be configured so that the user can connect it with a device used for communication with other users, such as a so-called headphone (or earphone) or an external microphone.

As described above, as an illustrative example of the information processing system according to the present embodiment, an example of the form of the information processing apparatus 10 used in the information processing system is described above with reference to FIGS. 11 and 12.

[5.2. Second Illustrative Example: Example of Device to be Linked]

Subsequently, as a second illustrative example, an example of a device to be linked by the information processing apparatus 10 in the information processing system according to the present embodiment will be described. In the example described above, the information processing apparatus 10 uses, in one example, an earphone, a microphone, or the like as an input/output interface. On the other hand, as long as a user holding the information processing apparatus 10 can communicate with another user through the information processing apparatus 10, the input/output interface for the information processing apparatus 10 is not necessarily limited and may be switched dynamically depending on the situation.

In a specific example, when a user who was out of the house is returning home, the information processing apparatus 10 may switch the input/output device from a device worn by a user, such as an earphone or a microphone, into a loudspeaker, a microphone, or the like placed in the home.

In this case, in one example, the information processing apparatus 10 may determine whether the user has returned home on the basis of the user's position information detected by GPS or the like. In addition, in another example, the information processing apparatus 10, in the case of recognizing a loudspeaker or a microphone placed in the user's home, may switch the input/output device to the recognized loudspeaker or microphone.

Further, in another example, the information processing apparatus 10, in the case of recognizing that a user has gotten on a car, may use a loudspeaker or a microphone included in a car navigation system installed in the car as the input/output device. In this case, in one example, the information processing apparatus 10, in the case of being connected to an in-vehicle network, may recognize that the user has gotten on the car, and may be connected to the loudspeaker or the microphone included in the car navigation system via the in-vehicle network.

As the second illustrative example, an example of a device to be linked by the information processing apparatus 10 in the information processing system according to the present embodiment is described above.

[5.3. Third Illustrative Example: Example of Additional Control]

In the above description, the example in which the information processing apparatus 10 according to the present embodiment controls the mode of the communication via the network depending on whether the users who are targets of interactive communication are in the face-to-face state is described. On the other hand, the information processing apparatus 10 may control modes of other operation in addition to the control of the communication via the network depending on the result obtained by determining whether the users who are targets of interactive communication are in the face-to-face state. Thus, as a third illustrative example, an example of the operation control depending on the result obtained by determining whether the users who are targets of interactive communication performed through the information processing apparatuses 10 are in the face-to-face state is described below.

In one example, there may be the case where the information processing apparatus 10 causes the image capture unit to acquire image data such as a moving image or a still image on the basis of an operation performed by the user who holds the information processing apparatus 10. In this case, the information processing apparatus 10 may switch a method of recording the acquired image data depending on whether the user is in the face-to-face state with another user.

More specifically, in the case where the user who holds the information processing apparatus 10 is in the non-face-to-face state with another user, the information processing apparatus 10 causes a storage unit (e.g., the storage unit 27) included in the information processing apparatus 10 to store the image data acquired by the image capture unit. Moreover, in the case where the information processing apparatus 10 receives an explicit instruction from the user, the image data stored in the storage unit may be shared with an information processing apparatus 10 held by the other user.

On the other hand, in the case where a user who holds the information processing apparatus 10 is in the face-to-face state with another user, the information processing apparatus 10 may automatically share the image data acquired by the image capture unit with the information processing 10 held by the other user.

In this way, the information processing apparatus 10 according to the present embodiment may switch the modes of various operations, depending on whether the users who are targets of interactive communication are in the face-to-face state. Moreover, the example described above is merely an example, and as long as the information processing apparatus 10 can switch the modes of various operations depending on whether the users who are targets of interactive communication are in the face-to-face state, the operation to be performed is not specifically limited.

As the third illustrative example, an example of the operation control depending on the determination result obtained by the information processing apparatus 10 determining whether the users who are targets of interactive communication are in the face-to-face state is described above.

<6. Hardware Configuration>

Figure 13:
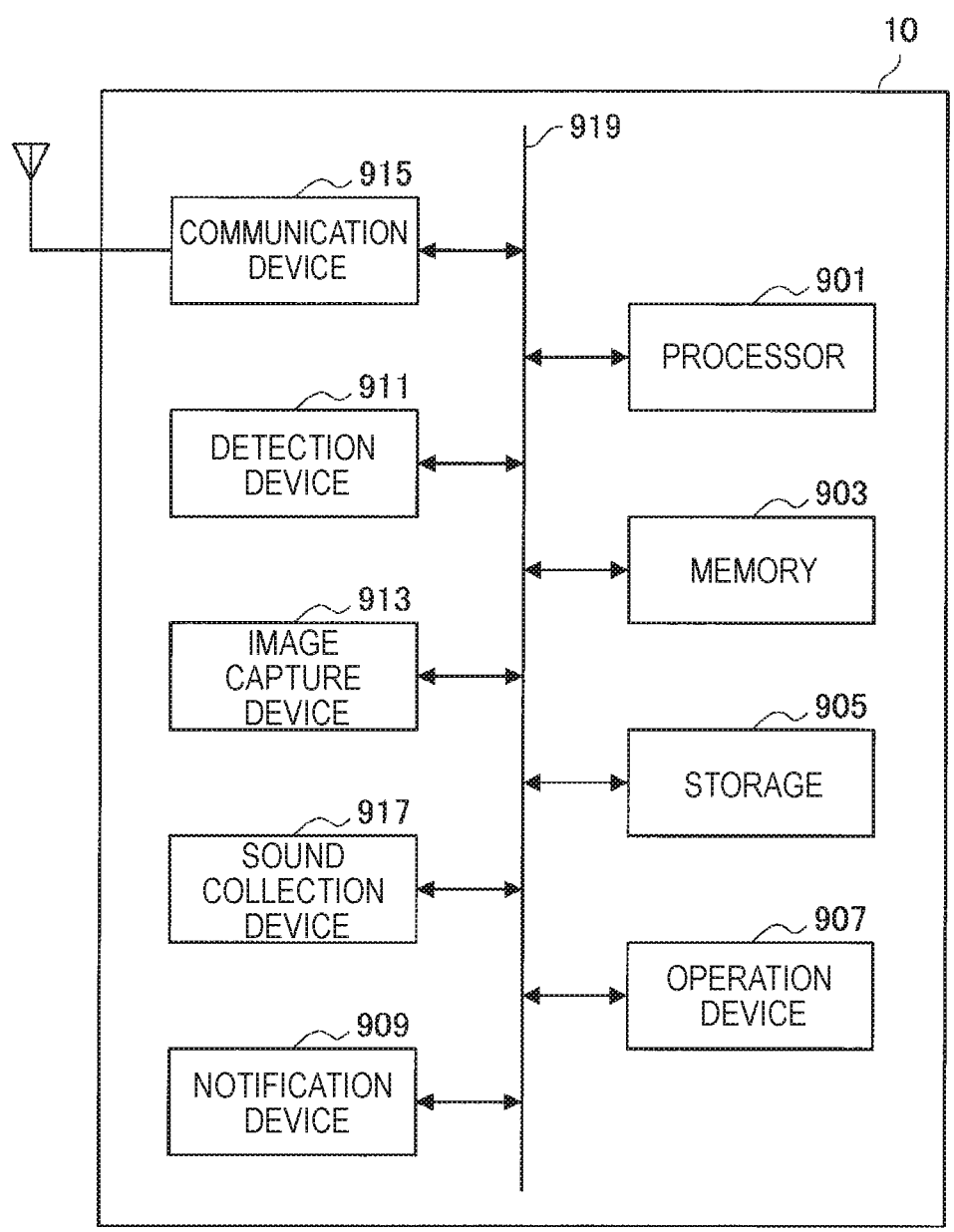
FIG. 13 is a diagram illustrating an example of a hardware configuration of the information processing apparatus according to the present embodiment.

Next, an example of a hardware configuration of the information processing apparatus 10 according to an embodiment of the present disclosure will be described with reference to FIG. 13. FIG. 13 is a diagram illustrating an example of the hardware configuration of the information processing apparatus 10 according to an embodiment of the present disclosure.

As illustrated in FIG. 13, the information processing apparatus 10 according to the present embodiment includes a processor 901, a memory 903, a storage 905, an operation device 907, a notification device 909, a detection device 911, a communication device 915, a sound collection device 917, and a bus 919. Further, the information processing apparatus 10 may include an image capture device 913.

The processor 901 may be, for example, a central processing unit (CPU), a graphics processing unit (GPU), a digital signal processor (DSP), or a system on chip (SoC), and executes various types of processing of the information processing apparatus 10. The processor 901 can include, for example, electronic circuits for executing various kinds of arithmetic processing. Moreover, the determination unit 103, the input/output control unit 105, and the history recording unit 107, which are described above, can be implemented as the processor 901.

The memory 903 includes a random access memory (RAM) and a read only memory (ROM), and stores a program and data to be executed by the processor 901. The storage 905 can include a storage medium such as a semiconductor memory or a hard disk. In one example, the storage unit 27 described above can be implemented as at least one of the memory 903 and the storage 905 or as a combination of the memory 903 and the storage 905.

The operation device 907 has a function of generating an input signal for the user to perform a desired operation. The operation device 907 can be configured as, for example, a touch panel. In addition, as another example, the operation device 907 may include, for example, an input unit for a user to input information, such as a button, a switch, or a keyboard, and include an input control circuit that generates an input signal on the basis of input by the user and supplies the input signal to the processor 901. Moreover, at least some configuration of the input unit 23 described above may be implemented as the operation device 907.

The notification device 909 is one example of the output device, and, in one example, may be a device such as a liquid crystal display (LCD) device or an organic light emitting diode (OLED) display. In this case, the notification device 909 can notify the user of predetermined information by displaying a screen. Moreover, the output unit 25 described above can be implemented as the notification device 909.

Further, the notification device 909 may be a device, such as a loudspeaker, which notifies the user of predetermined information by outputting a predetermined acoustic signal.

Moreover, the above-described example of the notification device 909 is merely an example, and a mode of the notification device 909 is not limited to a particular mode as long as the notification device 909 can notify the user of predetermined information. In a specific example, the notification device 909 may be a device, such as a light emitting diode (LED), for notifying the user of predetermined information by lighting or blinking patterns. Moreover, the output unit 25 described above can be implemented as the notification device 909.

The detection device 911 is a device for detecting various kinds of states. The detection device 911 can include, in one example, a sensor for detecting various kinds of states, such as a touch sensor, a pressure sensor, an illuminance sensor, and a humidity sensor. In addition, the detection device 911 may include a sensor for detecting contact or proximity of a predetermined target, such as an electrostatic sensor. In addition, the detection device 911 may include a sensor for detecting a change in the position or orientation of a predetermined casing, such as an acceleration sensor or an angular velocity sensor. In addition, the detection device 911 may include a sensor for detecting a predetermined target, such as a so-called optical sensor. Moreover, the detection unit 21 described above can be implemented as the detection device 911.

The image capture device 913 includes an image sensor that captures a subject and obtains digital data of the captured image, such as a complementary metal-oxide semiconductor (CMOS) image sensor or a charge coupled device (CCD) image sensor. That is, the image capture device 913 has a function of photographing a still image or a moving image via an optical system such as a lens under the control of the processor 901. The image capture device 913 may cause the captured image to be stored in the memory 903 or the storage 905. Moreover, at least some structural elements in the input unit 23 described above can be implemented as the image capture device 913.

The sound collection device 917 is a device, such as a microphone, for collecting voice uttered from the user and acoustic of a surrounding environment and acquires them as acoustic information (acoustic signal). In addition, the sound collection device 917 may acquire data indicating an analog acoustic signal indicating the collected voice or acoustic as acoustic information, or may convert the analog acoustic signal into a digital acoustic signal and acquire data indicating the converted digital acoustic signal as the acoustic information. Moreover, some configuration of the input unit 23 described above can be implemented as the sound collection device 917.

The communication device 915 is a communication means included in the information processing apparatus 10, and communicates with an external apparatus via a network. The communication device 915 is a wired or wireless communication interface. In the case where the communication device 915 is configured as a wireless communication interface, the communication device 915 may include a communication antenna, a radio frequency (RF) circuit, a baseband processor, or the like.

The communication device 915 has a function of performing various kinds of signal processing on a signal received from an external apparatus and can supply a digital signal generated from the received analog signal to the processor 901. Moreover, the communication unit 101 described above can be implemented as the communication device 915.

The bus 919 connects the processor 901, the memory 903, the storage 905, the operation device 907, the notification device 909, the detection device 911, and the communication device 915 with each other. The bus 919 can include a plurality of types of buses.

Further, it is also possible to create a program for causing hardware such as a processor, a memory, and a storage incorporated into a computer to exert a function equivalent to the structural elements included in the above-described information processing apparatus 10. In addition, it is also possible to provide a computer readable storage medium in which the program is recorded.

<7. Concluding Remarks>

As described above, the information processing apparatus 10 in the information processing system according to the present embodiment determines whether a plurality of users who are targets of interactive communication are in the face-to-face state (i.e., whether direct communication is allowed), and controls the communication via the network depending on the determination result.

In a specific example, in the case where the information processing apparatus 10 detects that the users are in the face-to-face state, the information processing apparatus 10 suppresses the communication via the network between the users. This makes it possible to prevent occurrence of a situation in which the direct communication and the communication via the network coexist between the users and one communication obstructs the other communication.

Further, in the case where the information processing apparatus 10 detects that the users are in the non-face-to-face state, the information processing apparatus 10 activates the communication via the network between the users. This makes it possible for the user to continue communicating with another user even in the case where the the user is apart from the other user and the direct communication between them is difficult.

Specifically, the information processing system according to the present embodiment makes it possible for the user to continue communicating with the partner in a more preferred mode without being conscious of whether the user faces the partner even in a situation in which their state are changed frequently between the face-to-face state and the non-face-to-face state.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a control unit configured to control, depending on a result obtained by determining whether first communication without using an electronic network is allowed between a first user to be a communication target and a second user different from the first user, a mode of second communication via the network between the first user and the second user.

(2)

The information processing apparatus according to (1),
in which, in a case where the first communication is determined to be allowed between the first user and the second user, the control unit suppresses the second communication.

(3)

The information processing apparatus according to (2),
in which, in the case where the first communication is determined to be allowed between the first user and the second user, the control unit suppresses output of at least some pieces of information among pieces of information transmitted or received via the network between a terminal of the first user and a terminal of the second user.

(4)

The information processing apparatus according to (3),
in which, in the case where the first communication is determined to be allowed between the first user and the second user, the control unit suppresses an output level of the some pieces of information by lowering the output level of the some pieces of information.

(5)

The information processing apparatus according to (3),
in which, in the case where the first communication is determined to be allowed between the first user and the second user, the control unit suppresses an output level of the some pieces of information by stopping output of the some pieces of information.

(6)

The information processing apparatus according to (2),
in which, in the case where the first communication is determined to be allowed between the first user and the second user, the control unit disconnects communication via the network between a terminal of the first user and a terminal of the second user.

(7)

The information processing apparatus according to any one of (1) to (6), including:
a determination unit configured to determine whether the first communication is allowed between the first user and the second user.

(8)

The information processing apparatus according to (7),
in which the determination unit determines that the first communication is not allowed on a basis of a second condition different from a first condition for determining that the first communication is allowed.

(9)

The information processing apparatus according to (7) or (8),
in which the determination unit determines whether the first communication is allowed on a basis of a result obtained by calculating a distance between the first user and the second user.

(10)

The information processing apparatus according to (9),
in which the control unit controls the second communication depending on the distance between the first user and the second user.

(11)

The information processing apparatus according to (10),
in which the control unit controls a sound volume of voice to be output on a basis of the second communication, depending on the distance between the first user and the second user.

(12)

The information processing apparatus according to (7) or (8),
in which the determination unit determines whether the first communication is allowed on a basis of a result obtained by determining whether at least one of the first user and the second user faces another user's side.

(13)

The information processing apparatus according to (7) or (8),
in which the determination unit determines whether the first communication is allowed on a basis of a result obtained by determining whether voice of at least one of the first user and the second user reaches another user.

(14)

The information processing apparatus according to (7) or (8),
in which the determination unit determines whether the first communication is allowed on a basis of a result obtained by causing a detection unit held by at least one of the first user and the second user to detect another user.

(15)

The information processing apparatus according to any one of (1) to (14),
in which the second communication includes communication using voice.

(16)

The information processing apparatus according to any one of (1) to (15),
in which the control unit, in a case where at least the first communication is determined to be allowed, records contents of the first communication as history information.

(17)

The information processing apparatus according to (16),
in which the control unit records the contents of the first communication and contents of the second communication in association with each other as the history information.

(18)

The information processing apparatus according to any one of (1) to (17),
in which the control unit is provided in a terminal of any one of the first user and the second user.

(19)

An information processing method including:
controlling, by a processor, depending on a result obtained by determining whether first communication without using an electronic network is allowed between a first user as a communication target and a second user different from the first user, a mode of second communication via the network between the first user and the second user.

(20)

A program causing a computer to execute:
controlling, depending on a result obtained by determining whether first communication without using an electronic network is allowed between a first user as a communication target and a second user different from the first user, a mode of second communication via the network between the first user and the second user.

REFERENCE SIGNS LIST 10 information processing apparatus
21 detection unit
23 input unit
24 output unit
25 output unit
27 storage unit
101 communication unit 103 determination unit
105 input/output control unit
107 history recording unit

The invention claimed is:

1. An information processing apparatus, comprising:
a central processing unit (CPU) configured to:
determine whether first communication is allowed between a first user and a second user different from the first user, based on whether at least one of the first user faces a side of the second user or the second user faces a side of the first user,
wherein the first communication is without an electronic network; and
control a mode of second communication between the first user and the second user, based on whether the first communication is allowed between the first user and the second user,
wherein the second communication is via the electronic network.

2. The information processing apparatus according to claim 1, wherein the CPU is further configured to suppress the second communication based on the determination that the first communication is allowed between the first user and the second user.

3. The information processing apparatus according to claim 2, wherein the CPU is further configured to suppress, based on the determination that the first communication is allowed between the first user and the second user, output of at least first pieces of information among pieces of information one of transmitted or received via the electronic network between a terminal of the first user and a terminal of the second user.

4. The information processing apparatus according to claim 3, wherein the CPU is further configured to suppress, based on the determination that the first communication is allowed between the first user and the second user, an output level of the at least first pieces of information by a lowering operation of the output level of the at least first pieces of information.

5. The information processing apparatus according to claim 3, wherein the CPU is further configured to suppress, based on the determination that the first communication is allowed between the first user and the second user, an output level of the at least first pieces of information by a stopping operation of output of the at least first pieces of information.

6. The information processing apparatus according to claim 2, wherein the CPU is further configured to disconnect, based on the determination that the first communication is allowed between the first user and the second user, communication via the electronic network between a terminal of the first user and a terminal of the second user.

7. The information processing apparatus according to claim 1, wherein the CPU is further configured to determine that the first communication is not allowed based on a second condition different from a first condition, wherein the first condition is for determination that the first communication is allowed.

8. The information processing apparatus according to claim 1, wherein the CPU is further configured to:
calculate a distance between the first user and the second user, and
determine whether the first communication is allowed based on the calculated distance.

9. The information processing apparatus according to claim 8, wherein the CPU is further configured to control the mode of the second communication based on the distance between the first user and the second user.

10. The information processing apparatus according to claim 9, wherein the CPU is further configured to control a sound volume of voice to be output, based on the second communication and the distance between the first user and the second user.

11. The information processing apparatus according to claim 1, wherein the CPU is further configured to determine whether the first communication is allowed based on whether at least one of voice of the first user reaches the second user or voice of the second user reaches the first user.

12. The information processing apparatus according to claim 1, wherein CPU is further configured to determine whether the first communication is allowed based on detection of the second user by a detection unit held by the first user.

13. The information processing apparatus according to claim 1, wherein the second communication includes communication using voice.

14. The information processing apparatus according to claim 1, wherein CPU is further configured to record, based on the determination that at least the first communication is allowed, contents of the first communication as history information.

15. The information processing apparatus according to claim 14, wherein CPU is further configured to record the contents of the first communication in association with contents of the second communication, as the history information.

16. The information processing apparatus according to claim 1, wherein the CPU in a terminal of one of the first user or the second user.

17. An information processing method, comprising:
determining, by a processor, whether first communication is allowed between a first user and a second user different from the first user, based on whether at least one of the first user faces a side of the second user or the second user faces a side of the first user,
wherein the first communication is without an electronic network; and
controlling, by the processor, a mode of second communication between the first user and the second user, based on whether the first communication is allowed between the first user and the second user,
wherein the second communication is via the electronic network.

18. A non-transitory computer-readable medium having stored thereon computer-readable instructions, which when executed by a computer, cause the computer to execute operations, the operations comprising:
determining whether first communication is allowed between a first user and a second user different from the first user, based on whether at least one of the first user faces a side of the second user or the second user faces a side of the first user,
wherein the first communication is without an electronic network; and
controlling a mode of second communication between the first user and the second user, based on whether the first communication is allowed between the first user and the second user,
wherein the second communication is via the electronic network.

* * * * *